US009021608B2

(12) United States Patent
Rogel et al.

(10) Patent No.: US 9,021,608 B2
(45) Date of Patent: Apr. 28, 2015

(54) METHODS AND APPARATUS FOR SHARING, TRANSFERRING AND REMOVING PREVIOUSLY OWNED DIGITAL MEDIA

(75) Inventors: Lawrence S. Rogel, Brookline, MA (US); John M. Ossenmacher, Balboa Island, CA (US); Micha Moffie, Somerville, MA (US); Amihai Viks, Ramat Gan (IL); Xiao Zou, Roxbury Crossing, MA (US)

(73) Assignee: ReDigi, Inc., Boston, MA (US)

( * ) Notice: Subject to any disclaimer, the term of this patent is extended or adjusted under 35 U.S.C. 154(b) by 0 days.

(21) Appl. No.: 13/406,237

(22) Filed: Feb. 27, 2012

(65) Prior Publication Data

US 2013/0031643 A1    Jan. 31, 2013

Related U.S. Application Data

(63) Continuation-in-part of application No. 12/983,257, filed on Dec. 31, 2010, now Pat. No. 8,627,500.

(60) Provisional application No. 61/291,498, filed on Dec. 31, 2009, provisional application No. 61/447,084, filed on Feb. 27, 2011, provisional application No. 61/451,463, filed on Mar. 10, 2011, provisional application No. 61/503,456, filed on Jun. 30, 2011, provisional application No. 61/552,871, filed on Oct. 28, 2011.

(51) Int. Cl.
| | |
|---|---|
| *G06F 7/04* | (2006.01) |
| *H04L 29/06* | (2006.01) |
| *G06F 21/62* | (2013.01) |
| *G06F 21/10* | (2013.01) |
| *G06F 21/60* | (2013.01) |
| *H04N 21/4627* | (2011.01) |

(52) U.S. Cl.
CPC .......... *H04L 63/123* (2013.01); *G06F 21/6245* (2013.01); *G06F 21/604* (2013.01); *H04L 63/10* (2013.01); *G06F 21/10* (2013.01); *H04N 21/4627* (2013.01); *G06F 2221/2107* (2013.01); *H04L 2463/101* (2013.01)

(58) Field of Classification Search
CPC .... G06F 21/6245; G06F 21/604; H04L 63/10
USPC .................................................... 726/29, 28
See application file for complete search history.

(56) References Cited

U.S. PATENT DOCUMENTS

| | | |
|---|---|---|
| 5,918,223 A | 6/1999 | Blum et al. |
| 6,078,929 A | 6/2000 | Rao |

(Continued)

OTHER PUBLICATIONS

[No Author] Amazon.com—Microsoft SideWinder X6 Keyboard as of Jan. 1, 2008 (obtained from the Internet Archive Wayback Machine http://web.archive.org).

(Continued)

*Primary Examiner* — Techane Gergiso
(74) *Attorney, Agent, or Firm* — Nutter McClennen & Fish LLP; David J. Powsner

(57) ABSTRACT

The invention provide systems and methods for management of digital media objects, comprising first and second client digital data processors (e.g., personal (or private) computers, laptops, dedicated music devices, electronic book readers, and so forth) that are in communications coupling with one or more stores (e.g., dedicated disk drives, flash drives, cloud storage, etc.). At least one digital media object (DMO) or copy thereof is stored in one or more of those stores and is accessible by at least one of the first and second client digital data processors.

14 Claims, 6 Drawing Sheets

(56) References Cited

U.S. PATENT DOCUMENTS

| | | | |
|---|---|---|---|
| 7,076,652 | B2 | 7/2006 | Ginter et al. |
| 7,110,984 | B1 | 9/2006 | Spagna et al. |
| 7,277,766 | B1 | 10/2007 | Khan et al. |
| 7,496,540 | B2 | 2/2009 | Irwin et al. |
| 7,809,644 | B2 | 10/2010 | Stefik et al. |
| 8,161,103 | B2 * | 4/2012 | Lee ............................ 709/203 |
| 8,627,500 | B2 | 1/2014 | Rogel et al. |
| 2002/0052849 | A1 | 5/2002 | McCutchen et al. |
| 2002/0095429 | A1 * | 7/2002 | Song et al. ................ 707/104.1 |
| 2003/0004885 | A1 | 1/2003 | Banerjee et al. |
| 2003/0229529 | A1 | 12/2003 | Mui et al. |
| 2004/0111619 | A1 | 6/2004 | Laurie et al. |
| 2005/0004875 | A1 | 1/2005 | Kontio et al. |
| 2005/0246193 | A1 * | 11/2005 | Roever et al. .................... 705/1 |
| 2006/0021056 | A1 | 1/2006 | Koppen |
| 2007/0073592 | A1 | 3/2007 | Perry et al. |
| 2007/0089174 | A1 | 4/2007 | Bader et al. |
| 2007/0104329 | A1 | 5/2007 | England et al. |
| 2007/0124583 | A1 | 5/2007 | Andersson et al. |
| 2007/0130585 | A1 * | 6/2007 | Perret et al. ..................... 725/46 |
| 2007/0198419 | A1 * | 8/2007 | Park et al. ....................... 705/52 |
| 2007/0210155 | A1 | 9/2007 | Swartz et al. |
| 2007/0219917 | A1 * | 9/2007 | Liu et al. ......................... 705/59 |
| 2007/0276767 | A1 | 11/2007 | Kim et al. |
| 2007/0283381 | A1 | 12/2007 | Sidi et al. |
| 2008/0033802 | A1 * | 2/2008 | McKenna et al. ............... 705/14 |
| 2008/0065911 | A1 * | 3/2008 | Elazar et al. ................... 713/194 |
| 2008/0072335 | A1 | 3/2008 | David et al. |
| 2008/0086422 | A1 | 4/2008 | Wolff et al. |
| 2008/0120242 | A1 * | 5/2008 | Krig et al. ....................... 705/59 |
| 2008/0127177 | A1 | 5/2008 | Oh et al. |
| 2008/0133940 | A1 * | 6/2008 | Laurie et al. .................. 713/193 |
| 2008/0154626 | A1 | 6/2008 | Gounares et al. |
| 2008/0163377 | A1 | 7/2008 | Lee et al. |
| 2008/0208663 | A1 | 8/2008 | Walker et al. |
| 2008/0215633 | A1 | 9/2008 | Dunkeld et al. |
| 2008/0263681 | A1 * | 10/2008 | Dooms et al. ................... 726/33 |
| 2008/0270307 | A1 * | 10/2008 | Olson et al. ..................... 705/51 |
| 2008/0294453 | A1 | 11/2008 | Baird-Smith et al. |
| 2008/0294531 | A1 | 11/2008 | Nassimi |
| 2009/0083764 | A1 | 3/2009 | Davis et al. |
| 2009/0106847 | A1 * | 4/2009 | Krupman et al. ................ 726/26 |
| 2009/0164794 | A1 * | 6/2009 | Verosub et al. ............... 713/181 |
| 2009/0240745 | A1 | 9/2009 | Stahl et al. |
| 2009/0307062 | A1 | 12/2009 | Lutnick et al. |
| 2009/0327094 | A1 | 12/2009 | Elien et al. |
| 2010/0010887 | A1 | 1/2010 | Karlin et al. |
| 2010/0063873 | A1 * | 3/2010 | McGucken .................. 705/14.4 |
| 2010/0067705 | A1 | 3/2010 | Boccon-Gibod et al. |
| 2010/0333211 | A1 | 12/2010 | Schonfeld et al. |
| 2011/0047041 | A1 * | 2/2011 | Kemery .................... 705/26.25 |
| 2011/0162086 | A1 * | 6/2011 | Rogel et al. ..................... 726/28 |
| 2011/0202415 | A1 | 8/2011 | Casares et al. |
| 2012/0022932 | A1 | 1/2012 | Ossenmacher et al. |
| 2013/0204979 | A1 | 8/2013 | Rogel et al. |
| 2014/0041058 | A1 | 2/2014 | Rogel et al. |

OTHER PUBLICATIONS

[No Author] IEEE P1817 Standard for Consumer-ownable Digital Personal Property, http://grouper.ieee.org/groups/1817/HowItWorks.html, dated Nov. 11, 2011.

[No Author] New IEEE Standards Initiative Aims at Digital Personal Property Copyright and Technology, Jul. 2, 2010, 10 pages.

[No Author] Status Page; standards.ieee.org/development/wg/DPP.html, dated Nov. 11, 2011.

International Search Report and Written Opinion mailed Jan. 19, 2012 for Application No. PCT/US2010/62658 (10 Pages).

International Preliminary Report on Patentability for Application No. PCT/US2010/062658, mailed Jul. 12, 2012 (8 pages).

International Search Report and Written Opinion mailed Nov. 15, 2011 for Application No. PCT/US2011/44964 (13 Pages).

International Preliminary Report on Patentability for Application No. PCT/US2011/044964, mailed Jan. 31, 2013 (10 pages).

International Search Report and Written Opinion mailed Aug. 3, 2012 for Application No. PCT/US2012/26776 (23 Pages).

Sweazey, Paul et al., "Digital Emulation of Consumer-Ownable Products", Consumer Electronics (ICCE), 2011 IEEE International Conference, dated Jan. 9-12, 2011.

International Search Report for Application No. PCT/US2013/024931, issued Apr. 15, 2013. (12 pages).

\* cited by examiner

METHODS AND APPARATUS FOR SHARING, TRANSFERRING AND REMOVING PREVIOUSLY OWNED DIGITAL MEDIA This claims the benefit of filing of U.S. Patent Application Ser. No. 61/552,871, filed 28 Oct. 2011, U.S. Patent Application Ser. No. 61/503,456, filed Jun. 30, 2011, U.S. Patent Application Ser. No. 61/451,463, filed Mar. 10, 2011, U.S. Patent Application Ser. No. 61/447,084, filed Feb. 27, 2011, all entitled "Methods And Apparatus For Sharing, Transferring And Removing Previously Owned Digital Media," and the teachings of all of which are incorporated by reference herein.

This is a continuation in part of U.S. patent application Ser. No. 12/983,257, filed Dec. 31, 2010, which claims the benefit of filing of U.S. Patent Application Ser. No. 61/291,498, entitled Methods and Apparatus for Sharing, Transferring and Removing Previously Owned Digital Media, filed Dec. 31, 2009, the teachings of both of which are incorporated herein by reference.

BACKGROUND OF THE INVENTION

This application is related to PCT/US2010/062658, entitled "Methods And Apparatus For Sharing, Transferring And Removing Previously Owned Digital Media," which published as WO2011/082387, the teachings of which are incorporated herein by reference.

The invention pertains to digital media and, more particularly, by way of non-limiting example, to the management of music, e-books, videos and games, other software, and/or combinations of the foregoing, and other forms of digital content or, as referred to herein, "digital media." The invention has application, by way of non-limiting example, in identifying, sharing, transferring, redistributing and removing previously owned digital media.

Digital computer music is very popular but so is the practice of making and distributing copyright-infringing copies. The music industry has tried many ways to prevent unauthorized copying and distributing digital music. The problem is not limited to digital music, however, digital movies, e-books, games and other software and many other digital media objects are also subject to such copying.

Some methods of playing digital music and videos, such as DVD players and Microsoft's Windows Media Player, will only play objects that can be verified as original and legal. Other devices go even further and remove content deemed illegal. For example, the producers of special purpose devices for playing music, running software games and other software, and displaying e-books have retained the right to remove content even after it is purchased and installed on a user's device. For example, digital media objects purchased through Apple's "app" store can be remotely removed from an iPhone or iTouch without the owner's knowledge. Similarly for Amazon's Kindle e-book reader. This can be done in a vertical market in which the producer of the device is also the sole content distributor.

In a non-vertical market, when there is a personal computer in the chain of producer to consumer, it is often challenging to determine if a file contains a particular digital media object. Small changes to the file undetectable by the viewer or listener make it hard to determine the exact contents of a file.

Other technology, however, can identify the contents of a digital media object. For example, in the case of digital music, there are several ways to perform acoustic fingerprinting or content-based audio identification, e.g. see U.S. Pat. No. 7,277,766 and U.S. Pat. No. 5,918,223. These and other methods identify content from excerpts of only a few seconds long and deal with shifting (not knowing exactly where in the content is the excerpt). Some can also handle other sources of degradation such as pitching (playing it faster or slower), equalization, and background noise. They are relatively computationally efficient.

There are two fundamental processes for identifying the content of a digital media object (not just audio): fingerprint extraction and matching algorithm. The first processes the contents of a digital media object producing a set of features that are particular to the specific object. The second uses these to identify the object by querying a database of known objects and their features.

Note that the second process is not needed when the digital media object is known. For example, consider the case when one wants to find all files containing the Beatle's song "Yesterday." Given a fingerprint of "Yesterday," one just compares this with the fingerprints of all files.

Fingerprinting should not be confused with digital watermarking which relies on inserting identifying features into the content itself, and therefore changing the nature of the content. Watermarks must be inserted at the source in order to identify content and may be changed or removed at a later time by anyone.

Like audio, video fingerprinting is also a well-known technology. For audio and video, there are many fingerprinting services, such as:

| | |
|---|---|
| Advestigo | (audio, video and image fingerprinting) |
| Attributor | (image and video fingerprinting) |
| Auditude Connect technology | (audio and video fingerprinting) |
| Audible Magic | (audio video image fingerprinting) |
| AudioFingerprint | at MusicBrainz's wiki |
| INA | (video fingerprinting) |
| iPharro Media | (video fingerprinting) |
| Philips Content Identification | (audio and video fingerprinting) |
| MetatOGGer | freeware using the MusicDNS service for identifying audio files |
| New Media Lab | broadcast monitoring service using audio fingerprinting technology. |
| Civolution | (audio and video fingerprinting) |
| Thomson | (video fingerprinting) |
| Vercury | (audio, image and video fingerprinting) |
| Vidyatel Video conform, TV tracking and Management | (frame accurate video fingerprinting) |
| Vobile Content Identification and Management | (audio and video fingerprinting) |
| YUVsoft | (video fingerprinting and search) |
| Zeitera | (video fingerprinting) |

Electronic books can be read on a computer, laptop, smart phone, PDA, or specialized e-book reader. Many e-book readers use e-ink as a display device because they require less power, and are easy to read in bright sun light, and are less expensive. E-ink currently cannot render animations with sufficient speed to look seamless. Consequently, e-book readers tend to be of limited computational value, and are usually dedicated to the single function of displaying the pages of an electronic book. The Illiad IRex, Amazon Kindle, Sony Reader, and the Barns-n-Noble Nook are some dedicated e-book readers.

To date, the publishers have a tighter control on the distribution of e-books. There are some digitizing and scanning services, such as the Gutenberg Project and Google's book scanning effort, that place digital versions of many books in the public domain. It is much easier to fingerprint books, since the words have a much more standard format.

Depending on the type of ebook software, the ebook file is either encrypted to a specific computer or device (meaning it can only be read on that computer or device) or it is encrypted to a specific user's account (meaning it can be read on any device or computer which contains that user's secret account information).

If an ebook has been protected for only one person to read, then consumers (or "users") download the file to their computer and must read the ebook on that computer (or on other devices containing their secret account information). Copies of the ebook can only be read on authorized computers or by authorized users.

If a publisher/author has decided not to copy-protect their ebook, then consumers (or "users") download the file to their computer and can then copy it to any other computer/device they choose. The ebook may be read on any supported computer and by any user.

Video games and other software and other digital media objects work in a similar fashion.

In view of the foregoing, an object of the invention is to provide improved systems and methods for digital data processing and, more particularly, for the management of music, e-books, games (a/k/a video games, computer games, and/or digital games) and other software and other forms of digital media.

SUMMARY OF THE INVENTION

The foregoing are among the objects attained by the invention which provides, in some aspects, systems and methods for managing digital media objects (e.g., digital music files) so that actions taken with respect to them verifiably mimics at least some of the consequences those actions would have on the physical counterparts of those objects, e.g., record albums or CDs.

Thus, for example, in related aspects, the invention provides such systems and methods that support "ownership" (or acquisition) of digital objects such that, for example, when a user buys such an object, the user acquires an actual (or virtual) copy of it, along with the right to use it—subject, for example, to the copyright or other applicable laws or agreements. In further related aspects, the invention provides such systems and methods that support transfers of ownership such that, for example, when a user sells such an object, all copies of it are removed from the user's computer and other synchronized devices (e.g., MP3 players).

Further aspects of the invention provide such systems and methods that compensate for and/or take advantage of the digital nature of the object. According to these aspects of the invention, for example, if the owner's computer breaks, the digital object becomes corrupted, or the owner buys a new computer, the owner can still get the object.

In another aspect, the invention provides systems and methods, e.g., as described above, for transferring previously purchased digital media from the current legal owner to a new owner in compliance with the first sale doctrine, the Digital Millennium Copyright Act and so forth.

In another aspect, the invention provides systems and methods, e.g., as described above, for identifying, fingerprinting, compressing, deleting and transferring digital objects between parties.

In another aspect, the invention provides systems and methods, e.g., as described above, that support the right to transfer and facilitate the transfer of previously purchased digital media to another and provides permission for any parts of the file that contain personal or purchase data to be modified or removed.

In another aspect, the invention provides systems and methods, e.g., as described above, for removing all identified files from all devices that are or become connected to the application source device.

In another aspect, the invention provides systems and methods, e.g., as described above, for removing and or modifying the Personal ID (PID) associated with a specific file or files and adding a new PID to the file from which the previous PID has been removed and or modified.

In another aspect, the invention provides methods, e.g., as described above, for sharing digital data in a similar way to physical hard goods, e.g., within a software application, such that the owner can loan their media, for a predetermined period of time, to another person or entity whereby the lender will not have full access to the media within their application and the lendee will have full use with the exception of the ability to copy an exact duplicate of the media loaned.

In another aspect, the invention provides systems and methods for inventory control that algorithmically determine the likely inventory required on a periodic basis and that allow users to transfer desired media and receive credit for that media if inventory is required by the algorithm. On the other hand, if inventory is not currently required, users' inventory will be pegged and transferred as needed in order of priority. To facilitate that, systems according to these aspects of the invention will keep record of available media stored on user devices.

In another aspect, the invention provides systems and methods for annotation template that allows the digital media to be annotated with notes, pictures, graphs, ideas, any annotation that is separate from the digital media but overlays in the proper place when used in conjunction with the media source or can be used standalone as a summary of annotations for a specific media file. For example, the invention can include a copyright generator that continually updates and assigns copyright of all template annotations.

In another aspect, the invention provides systems and methods for media revenue allocation that algorithmically allocate a portion of applicable sales to the appropriate parties.

Further aspects of the invention are evident in Appendix A, in which exemplary systems and methods according to the invention are referred to as ReDigi™.

Other aspects of the invention provide systems for management of digital media objects that comprise first and second client digital data processors (e.g., personal (or private) computers, laptops, dedicated music devices, electronic book readers, video game devices and so forth) that are in communications coupling with one or more stores (e.g., dedicated disk drives, flash drives, cloud storage, etc.). At least one digital media object ("DMO") or copy thereof is stored in one or more of those stores and is accessible by at least one of the first and second client digital data processors. During a first period of time, the first client digital data processor is substantially free of discouragement from accessing the DMO or copy thereof by management logic (e.g., management software) that executes on that first client or is in communications coupling therewith. During a second (e.g., later) period of time that is mutually exclusive of the first period, the management logic selectively discourages the first client digital data processor from accessing the DMO or any copies thereof. Such discouragement can be, by way of example, the sending of warning messages, the blocking of access to one or more accounts or services, the blocking of file system access to such DMO or copies, and so forth. During that same second period, the second client digital data processor is substantially free of discouragement from accessing the DMO or its copies copy thereof by said management logic.

According to aspects of the invention, the first period corresponds to a time when the first client digital data processor (e.g., or operator thereof) "owns" the DMO. The second period corresponds to a time after which the first client (or operator) has relinquished ownership. In related aspects of the invention, that second period also corresponds to a time when the second client digital data processor (or operator) has assumed ownership of the DMO.

In another aspect, the invention provides systems and methods in which ownership of a DMO which is stored on a server (e.g., "in the cloud") is atomically transferred between accounts associated with two client devices. That is, transfer of ownership happens without the need of multiple copies so that there is never a time when two or more client devices (and, therefore, their respective owners) have ownership of or access to of the same DMO or copies thereof.

Further aspects of the invention provide systems, e.g., as described above, in which the DMO is any of a digital song, a video, a movie, an electronic book, a digital story, a digital article, a digital document, a digital still image, a digital game (a/k/a "video game" or "game" or "computer game"), or a portion thereof. In related aspects of the invention, the DMO is a file representing any of the foregoing.

Still further related aspects of the invention provide systems, e.g., as described above, wherein the management logic computes and/or assigns a common, unique fingerprint to the DMO and any copies thereof. In related aspects of the invention, that logic discourages the first client from accessing any file or other DMO having that common, unique fingerprint.

Still other aspects of the invention provide systems, e.g., as described above, in which the management logic effects such selective discouragement in response to a transfer-ownership event, e.g., a request by the first client to sell the DMO and/or by the second client to buy the DMO. In related aspects of the invention, the management logic can respond to a request by the first client to sell the DMO by confirming that digital data processor indeed owns it.

Yet still other aspects of the invention provide systems, e.g., as described above, wherein the management logic effects the selective discouragement in response to a transfer-ownership event. In related aspects, that event is signaled or otherwise effected by a server digital data processor that is in communications coupling with the first and second client digital data processors. In still further related aspects, the server thus effects an atomic transfer of ownership of the DMO from the first client to the second client.

As used herein, the terms "client digital data processor," "client," and the like refer to a respective one of the client digital data processors, e.g., under the control of and/or at the behest of its human owner and/or operator. As will be evident in the discuss that follows, these terms may refer to the action of human owner (or operator) him or herself.

Further aspects of the invention provides systems, e.g., as described above, wherein a collection of multiple digital data processors (e.g., personal computers, laptops, dedicated music devices, etc., owned by the same person or family) stand in place of one of the client digital data processors described above.

Still further aspects of the invention provide systems, e.g., as described above, that provide for managing, as digital media objects, songs, movies, games, other software, and/or combinations of the foregoing, videos, textual and/or graphic works (e.g., books) initially acquired in hardcopy format, as well as for managing the hardcopy (e.g., CD, DVD, book, phono-record) itself.

Still further aspects of the invention provide methods of method for management of digital media objects paralleling the operations described above.

These and other aspects of the invention are evident in the drawings and in the text that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Introduction

Figure 1D:
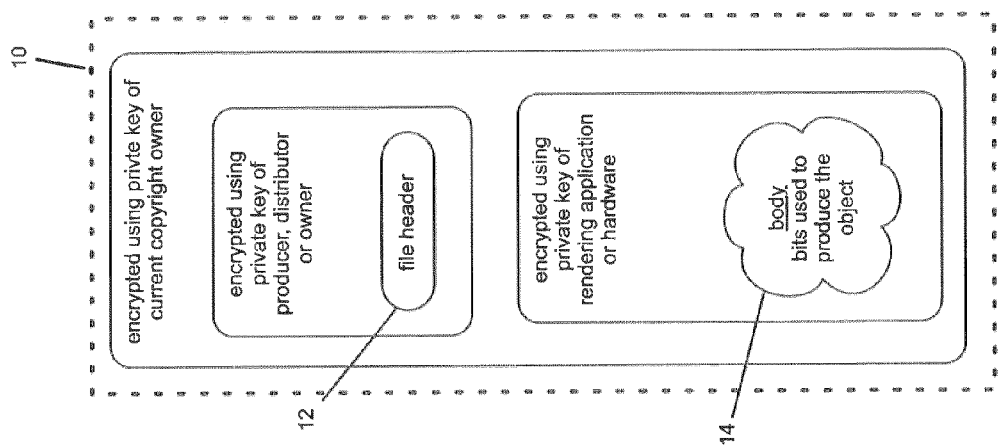
FIG. 1 depicts options to encrypt different parts of the file containing a digital media object in a system according to the invention.
Figure 1C:
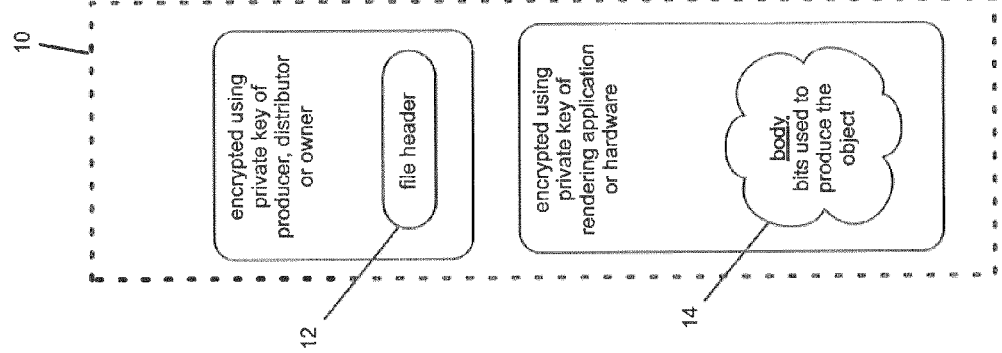
Figure 1B:
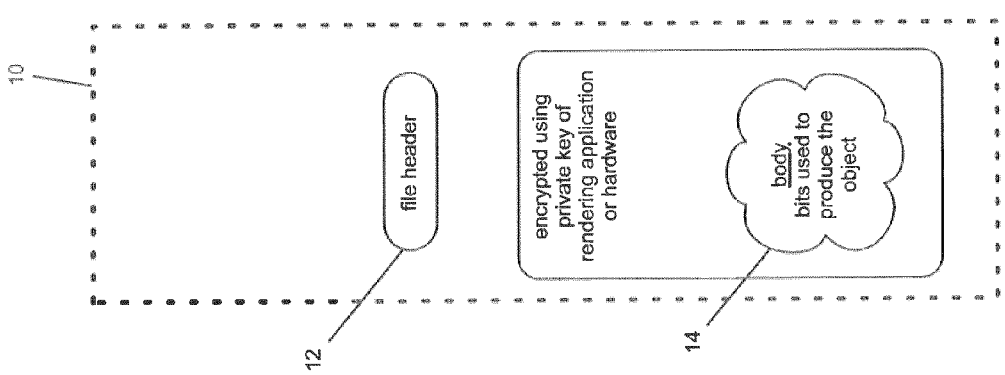
Figure 1A:
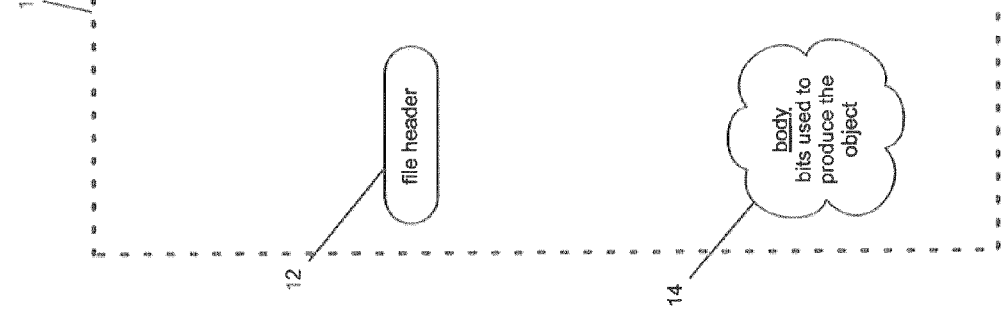

Digital media objects ("DMOs"), such as digital songs, movies, electronic books, video games, other software, and/or combinations of the foregoing, mimic many features and aspects of their corresponding physical objects, although, to date there are significant ways in which they still differ. In particular, there is no common way to resell a digital media object. To do so, a system is needed that can verify that someone owns a object before selling it, and that after selling it, they no longer have it. This document describes a way to do just that.

TERMINOLOGY

First it is helpful to define some terminology.

The term DMO or dmo as used herein denotes a "Digital Media Object." A DMO is usually a collection of bits organized as a computer file, but it could also be part of a file or it can be replicated in multiple files, that contains a creative work subject to protection by methods and systems according to the invention. These can be, by way of non-limiting example, digital songs, videos, movies, electronic books, stories, articles documents, still images, video games, other software, and/or combinations of the foregoing, and so forth—just to name a few. The bits of a DMO at any time can be represented on some physical storage, either volatile or non-volatile, but they always represent the same work in exactly the same way (excluding, as persons of ordinary skill in the art will appreciate, tags and other metadata of the type traditional supplied with digital music, digital video and other DMOs).

We use the term play to cover the broad category of what a device does to a digital media object for the use by the user or owner. In the case of a digital music or video object, play is the correct term. For a digital picture, render is the term used to display the picture, but for uniformity, we will say that a computer or digital picture frame will play the picture. Similarly for a digital book. We say that an e-book reader device will play the electronic or digital book object.

The term User generally refers to the user of methods and systems according to the present invention and or their respective digital data processors. The person will, for example, buy and sell DMO's with that digital data processor.

A file system or filesystem is a method of organizing computer files to make it easy to find and access them. File systems may use a data storage device, such as a hard disk, CD-ROM, flash storage device, and can involve maintaining the physical location of the files. File systems may be local or remote. File systems may also be maintained in a single location or distributed among multiple locations.

The term volume or disk volume is a technical computer term referring to a single accessible storage area within a single file system, typically resident on a single partition of a hard disk. As above, a volume may be local or remote and/or maintained in a single location or distributed among multiple locations.

A fingerprint of a computer file or of a digital media object is a bit string (typically, a short bit string) that uniquely identifies the original data, of a much larger size, for all practical purposes just as human fingerprints uniquely identify people for practical purposes. Fingerprints are typically used to avoid the comparison and transmission of bulky data. Fingerprint functions are related to (and sometimes confused with) checksums, hash functions, cryptographic hash functions, and digital signatures.

Digital Media Objects

Our era of computers has seen the "digitalization" of many different media. Digital cameras have transformed the world of photography. Film is no longer used to capture a picture, rather a picture is captured with a digital camera and the image is recorded as a series of pixels, or numbers/bits. A digital picture is a collection of bits that encode the image in a certain may and packaged together as a computer file. The pixels of the image are arranged in a rectangle with a certain number of columns and rows. Thus somewhere in the beginning of the file, are these two numbers. There is much more information that can be specified about the picture. This information is often stored in the header of the file before the actual bits of the image. The information in the header is sometimes referred to as "meta-data" since it describes things about the image but not the image itself.

Metadata in the header may specify information such as the camera, the shutter speed, time and date, the place or GPS coordinate as to where the picture was taken, and other things about the image. In addition, other information can be stored in this header, such as the photographer, the owner of the image, or a unique id representing a particular purchase of the image. The header might be sealed using encryption techniques to prevent others from changing this information. The image may be compressed using one of the standard techniques such as jpeg, tiff, postscript, bitmap, and many others. The image may or may not be encrypted.

FIG. 1 depicts various options for encrypting different parts of the file containing a digital media object in a system according to the invention. Thus, as shown in FIG. 1A, a digital media object 10 contains a header 12, along with a "body" 14 containing bits representing the digital song, video, or other file content. As shown in FIG. 1B, one option for encrypting the file includes encrypting the body 14 using a private key of the hardware device or software application that will be used by the user to render (or, more generally, "play") the object 10. As shown in FIG. 1C, another option is to additionally encrypt the header 12, albeit using a private key associated with the distributor, producer or owner of the digital media object. Further, as shown in FIG. 1D, a further option is to encrypt both the header 12 and body 14—both encrypted in accord with FIG. 1C—with the private key of the copyright owner.

Music has seen a similar transformation. Music is no longer recorded on a paper-roll, record or tape. It too has been digitized and a recording placed in a file with a header similar to that of digital pictures. The music encoding, number of bits per second of playback, pitch, volume, Dolby encoding, and the dynamic range. Other information may also be placed in the header, again, such as the owner, producer, song title, and a whole lot more.

Pictures, music, and other digital media often contain more precision than can be observed, heard, or sensed by people or by the rendering technology. Consequently, variations in the bits specifying the object may not be noticeable. Two images may appear identical even though their bit representations differ slightly. One the one hand, this provides a challenge when trying to identify an image from its file representation. On the other-hand, it permits embedding information directly into the image or music that is not noticeable but can be used to watermark the object.

Of course, movies, which essentially are a combination of images and sound have been digitized and wrapped in a file or multiple files with detailed meta-data. There are many different formats for movies as well. Since movies require a large number of bits, they are often stored in multiple files but usually within one main directory representing the entire movie.

Computers have been used as "word processing" devices or desktop publishing for many years. More recently, there has been an increase in electronic books, or e-books. Again, the contents of a book are recorded digitally usually in a file or multiple files within a directory. Once again, there is meta-data associated with the e-book, that may contain the title, author, number of pages, and much more information.

Many other types of media are similarly treated. Computer games and other software, 3-D or holographic movies, karaoke, rock-band, maps, slide shows, maps, and more. We shall refer to all of these as "digital media objects."

Since digital media objects are just a file of binary data they can be easily copied. Unlike the physical counterparts, the copies are usually identical in that their binary specification are exactly the same. The meta-data may be the same or may differ depending on how the copy was made.

Typical Organization

Figure 2:
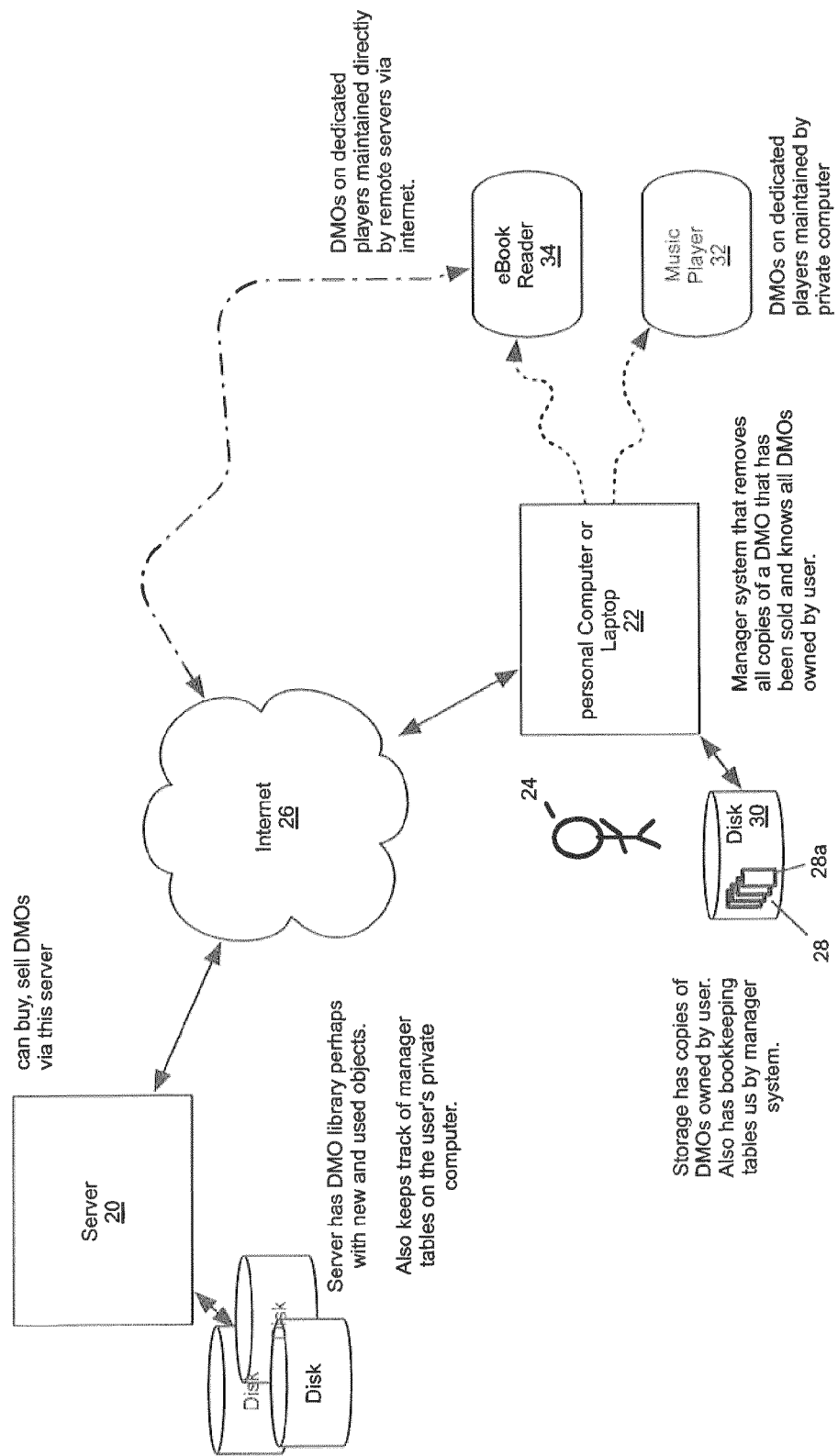
FIG. 2 depicts a system according to the invention.

FIG. 2 depicts a system for the management of digital media objects according to one practice of the invention. It will be appreciated that this is shown and described by way of example, and that other systems incorporating changes to that shown (and described) may fall are within the scope of the invention, as well. As shown in the drawing, There are many ways to install, maintain, distribute, sell, and other operations involving DMO's and their use. In a typical use case (see FIG. 2) of a system according to the invention, there is a server digital data processor ("server") 20 that is accessed by and in communications coupling with a client digital data processor, e.g., private computer 22 of a user 24 via the internet and/or other networks, wired, wireless or otherwise (collectively, herein, simply referred to as the Internet) 26. The server 20, which is typically remotely disposed from the client digital data processor (or "client") and which is therefore referred to occasionally herein without loss of generality as the "remote server," allocates storage space dedicated to this user 24 as well as other users for the storage of DMO's 28. The user (a term which is typically used herein to refer to an act of the client digital data processor, e.g., under the control of and/or at the behest of its human owner and/or operator). Every non-new DMO stored in the remote server 20, is owned by some user's account. The user's account has a pointer to the DMO stored on the disks associated with the remote server. The collection of pointer to the DMO's owned by a particular user 24 is referred to as the user's "box." A user may upload or download his or her DMO's between his or her storage area on the remote server and his or her private computer storage. Note that the private computer may have physically attached storage, e.g. hard drive, removable storage, e.g. flash memory attached via USB cable, or remote storage, e.g. a network storage device or rented cloud storage.

For a DMO to be offered for sale, it is first moved to the remote server if it is not already there via a previous purchase and stored to an area on the disk allocated to the user, and all copies of the DMO are purged from the user's private computer. When this is confirmed, the DMO is offered for sale.

To buy a DMO 28*a*, a user places an order. When a matching DMO is found that is being offered for sale a transaction occurs, that involves an exchange of money and the area allocated on the disk to the previous owner is reallocated to the new owner. As those skilled in the art will appreciate, such reallocation avoids the necessity of copying or moving the DMO on the server. Thus, there is only a single DMO before, during and after the sale transaction.

In preferred embodiments, this reallocation is performed as an "atomic" operation so that ownership of the allocated area (and, therefore, the DMO) is mutually exclusive and, correspondingly, so that there is no period in time when both the previous owner and the new owner have access to that area (and, therefore, to the DMO). As those skilled in the art appreciate, such atomicity can be effected via execution of a hardware instruction (on suitable platforms) or with semaphores or locks (on other platforms), or database atomic transactions, all in the manner known in the art as adapted in accord with the teachings hereof. In practice, the reallocation is effected via an atomic transaction in which a pointer to the area allocated to the DMO is removed from the "box" (or "locker") associated with the prior owner's account and inserted into the "box" associated with the new owners account. The new owner's private computer 22 may download the object 28*a* from the remote server 20 and store it on the local hard drive 30 of the private computer 22. Later, the DMO player 32 is connected to the private computer 22 and the DMO 28*a* is copied to that device 32.

As used herein, an area on server 20 is deemed to be allocated to a user if the user has a right of control over information stored in the area to the superior to that (and, typically, to the exclusion) of others. In this regard, the area is allocated to the user (e.g., by management software 25) in the conventional manner known in the marketplace for allocation of "cloud-based" storage space to users thereof (as evidenced, e.g., by Amazon's S3 storage service, Apple's iDisk storage service, Google's Docs service, and so forth), as adapted in accord with the teachings hereof to support reallocation as discussed above and elsewhere herein.

Access by computer 22 to DMOs 28*a* stored in area(s) allocated to user 24 can be effected via conventional protocols (e.g., HTTP, WebDAV. FTP, and so forth) and corresponding client/server interface components operating on the computer 22 and server 20, respectively—with management software 23, 25 cooperating with the respective interface components and/or the file systems of the respective devices 22, 20, as necessary, to effect access control consistent with the teachings hereof. Such access by computer 22 to those DMOs 28*a* may, alternatively or in addition, be effected using such proprietary protocols and/or interface components as may be realized by those skilled in the art.

Referring to FIG. 2, digital music can be played on a computer 22, a dedicated music device 32, or streamed from any DMO in the user's box on the remote server, etc. Electronic books can be read on computers 22, dedicated e-book readers 34. (The computer 22 and devices 32, 34 are collectively referred to herein as "client digital data processors"). Video games, other software, and/or combinations of the foregoing can similarly be played on computer 22, dedicated game players (not shown), and so forth. The digital media objects may be downloaded from a server 20 via the internet 26. They may first be stored on a computer 22 and then transferred to a dedicated media device, e.g., 32 or the dedicated media device, e.g., 34 can directly connect to the remote server 20 via the internet 26 for such download.

When the digital media objects are played on a computer 22 or when dedicated devices, e.g., 32, connects or communicates with a private computer 22, then DMO management software which is resident on the private computer 22 (and which can exchange status information with the server regarding DMOs owned, sold, awaiting sale, etc., by the user of that computer) manages the content on the device, e.g., 32. When the dedicated device, e.g., 34, directly communicates with its own remote server that controls the objects on the device, e.g., 34, either the including remotely deleting them. That management software 23 is referred to alternatively herein the "Manager Application," the "management system," the "management software," and the like. It cooperates as necessary with corresponding management software 25 executing on the server. For sake of simplicity, operation of software 25 is attributed below to the "server."

Ownership Concerns

Physical objects can be lent to friends, used, and then returned or resold. Ownership of an object often means physical possession. Owning an object often implies that one can sell that object. In the prior art, ownership of digital objects do not have this feature. It is easy to make an unlimited number of copies, sell these away and still have the original. Systems according to the invention overcome this by ensuring that, when a user sells a DMO, he/she is divested of all current and future copies—until he/she buys another. Thus, systems according to the invention allows one to buy, sell, return, and transfer digital objects in very much the same way as physical ones.

Functional Description

The following is a functional description of the invention as it pertains to an exemplary system for music management, sometimes referred to herein as ReDigi™. In alternate embodiments, similar systems can manage other types of digital media, such as, by way of non-limiting example, digital songs, video games, other software, and/or combinations of the foregoing, videos, movies, electronic books, stories, articles documents, still images, and so forth—just to name a few.

Figure 3A:
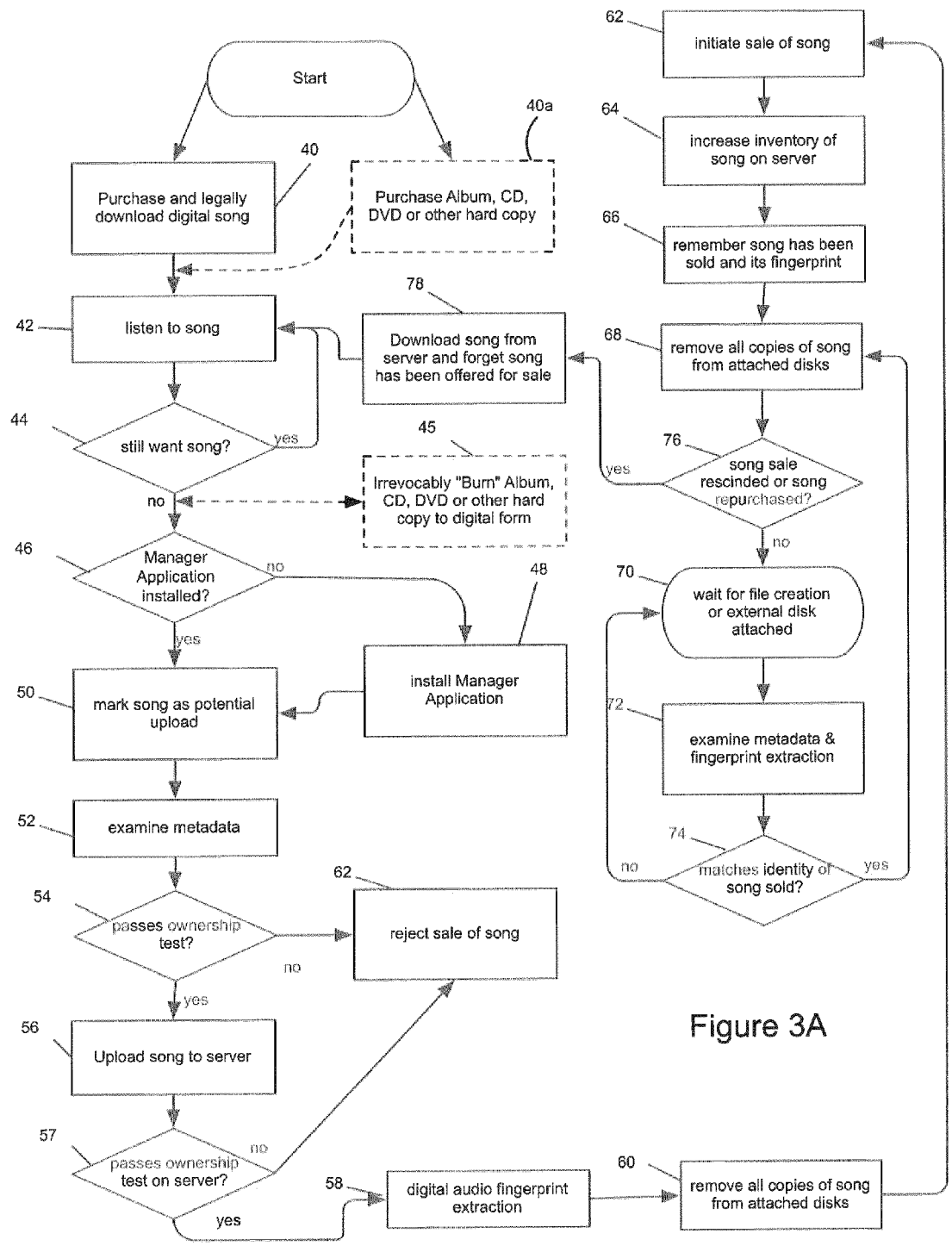
FIGS. 3A-3B depict processing of a music file in a system according to the invention.

In one exemplary embodiment, illustrated in FIG. 3A, a system according to the invention processes a music file in order to manage a single song. As shown in the drawing, a song can be legally purchased and downloaded by an owner. See step 40. Alternatively (or in addition), it can be acquired in "hardcopy" form—e.g., a song that is acquired in vinyl album format or on CD, a video game that acquired on a game disk, a video that is acquired on DVD, a graphic and/or textual work that is in a printed book or magazine form, and so forth. See step 40*a*.

It can be played by the owner until the owner wishes to sell the song. See steps 42-44.

Referring to step 45, in the case of a song, game, video, graphic/textual work and/or other creative content that is acquired by the lawful possessor (owner) in hardcopy form (see above), that content is "burned" to downloaded form (if not also acquired in that form)—i.e., a digital format characteristic of like media, e.g., MP3, WAV, etc. in the case of music files; MP4 or the like in the case of video files; EPUB, PDF, etc., in the case of graphic and/or textual works; and so forth, all, by way of non-limiting example—so that it can henceforth be used in embodiments of the invention in the manner of the downloaded content discussed elsewhere herein. Such conversion can be performed in the conventional manner known in the art, e.g., via use of a DVD reader, CD reader or USB turntable and digital encoding software (or hardware) in the case of DVDs, CDs, or vinyl albums; a video capture unit and digital encoding software (or hardware) in the case of movies on celluloid or other "analog" medium; digitizing scanner and PDF, EPUB or other electronic publishing software (or hardware) in the case of books; and so forth.

To avoid untoward proliferation of the underlying creative content that "burned" content, (i) the hardcopy form from which it was converted is destroyed or sequestered, and (ii) once so converted, the downloaded format is henceforth treated as the only a single copy whose ownership governed as discussed above and in the text that follows.

In embodiments in which the hardcopy form is destroyed, such destruction can be performed in a number of ways. By way of example, in the case of content acquired in CD or DVD format, it can be performed by use of a conventional DVD (or CD) burner and under control of conventional DVD (or CD) burning software adapted to render the DVD (CD) playless (e.g., turned into a "coaster"), e.g., by way of burning a random pattern of ones-and-zeros onto it, or otherwise. (In some embodiments, such adaptation is achieved by circumventing a test included in conventional DVD or CD burning software to avoid burning pre-recorded DVDs or CDs. This can be achieved, for example, by rewriting the DVD/CD driver software to circumvent that test). By way of further example, such destruction can be performed "manually" by shredding, breaking, burning, scratching, or otherwise destroying the hardcopy format, e.g., by action of the lawful possessor (owner) of the creative content, who, preferably, attests to such destruction via digital signature or other act. In embodiments employing a variant of the foregoing, the conversion to downloaded format, the destruction and/or attestation is performed by a third-party from whom the owner obtains the downloaded form.

In embodiments in which the hardcopy form is sequestered, this can be performed by the lawful possessor of the creative content, e.g., who can lockup and/or hide-away the hard hardcopy form (once it has been converted to downloaded format) so that it cannot be used and/or copied so long as converted downloaded exists—and, preferably, who also attests to such sequestration. As above, in embodiments employing a variant of the forgoing, the conversion to downloaded format, the sequestration and/or attestation are performed by a third-party from whom the owner obtains the downloaded form. In some preferred embodiments, that third-party is a party that hosts the server 20 in which the DMOs are maintained—e.g., so that ownership of the sequestered hardcopy can be readily transferred along with that of the DMO.

Referring to step 54, downloaded content (e.g., whether initially acquired by the lawful possessor in that format or burned to that format as discussed above in connection with step 45), is then checked for validity. If the song passes all validity checks (including examination of metadata and fingerprint extraction) applied by the Manager Application 23 (step 54) and by the server (step 57) after the song is uploaded (step 56), the song can be sold (see steps 46-60). Otherwise, sale is rejected (step 62). In the case the sale is permitted to proceed, the song is offered for sale by the server (step 64), is logged as sold (step 66) and if new copies of the song appear, e.g., as detected by waiting for external disk attachment or file creation (step 70) and examining for match with the sold song metadata and fingerprints of newly added files (steps 72-74), those are also deleted from the owner's system (step 68) until and unless the sale is rescinded by the owner (step 76). Until the song is actually sold, the sale can be rescinded (step 76) and the song can be downloaded (step 78) and its offer for sale forgotten. Note that if the song is repurchased, it will have different metadata, watermarkings, and fingerprints, so it will not match the identify of a sold song (step 74 will fail).

Figure 3B:
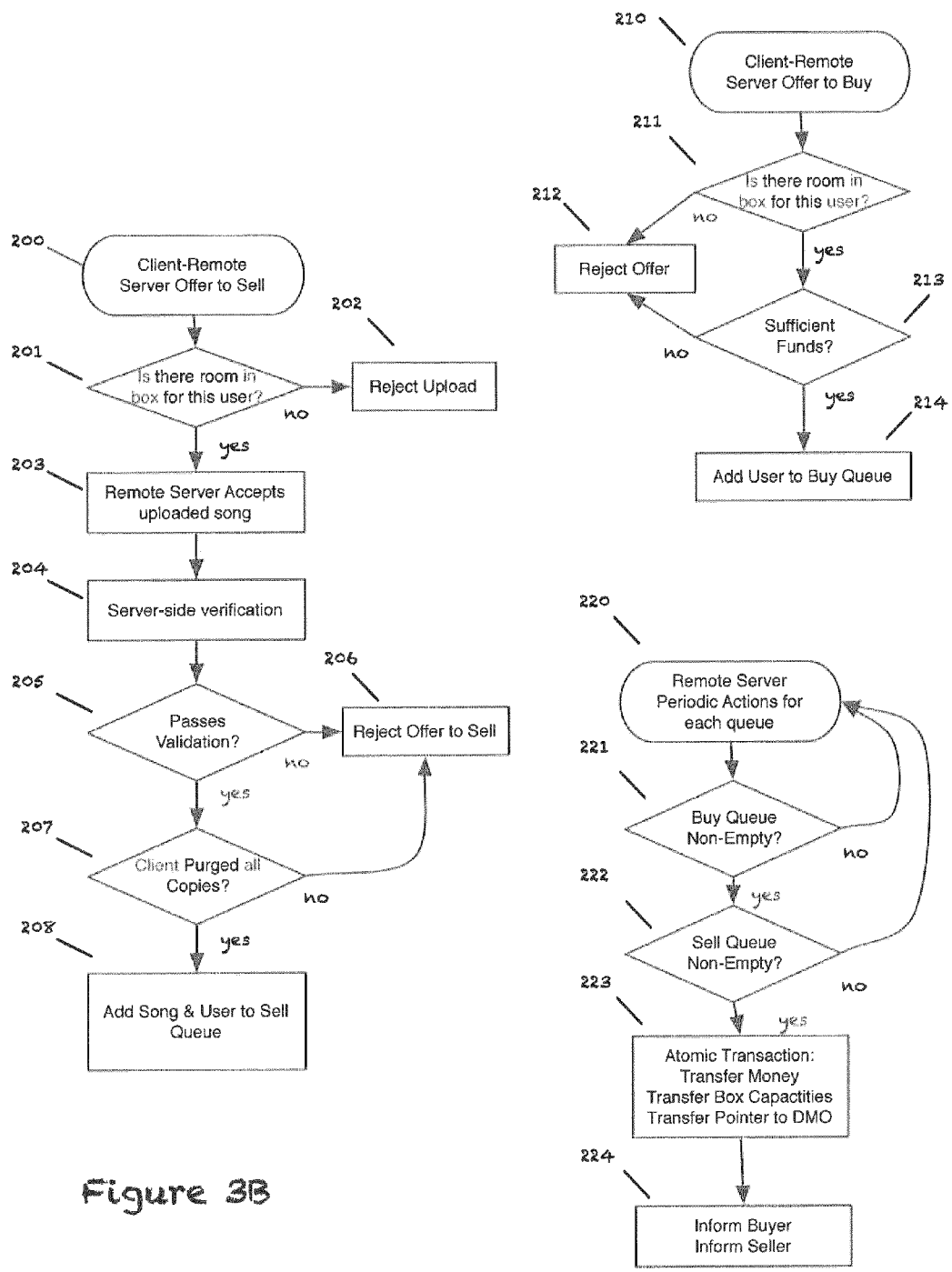

The remote server 20 performs three main functions, as depicted in FIG. 3B, to handle a user attempting to offer a DMO for sale 200-208, a user attempting to purchase a used DMO 210-214, and a matching procedure 220-224 to complete the transaction. The management software on the user's private computer 22 communicates with the remote server 20 to offer a DMO for sale 62. Before the song can be uploaded 56 the remote server checks that there is sufficient storage space for the DMO for this user before accepting the upload 201-203. The remote server performs additional verification checks 204 and then checks 207 with the management software on the user's computer to ensure all copies have been purged. If the user has several private computers running the management software, the remote server checks with all of them. If the checks pass, the remote server places the offer for sale 208 in a queue associated with this DMO's general identification description. For example, if a DMO is a song, then there is a queue associated with a song with this title, artist, album, and release year.

When a user wishes to purchase a used DMO, it communicates with the remote server 20 the DMO it wishes to purchase. For example, if a DMO is a song, then the user specifies the title, artist, album, and release year. The remote server ensures there is storage space available for this DMO 211 and if so, that the user's account has sufficient funds to purchase the DMO 213. If so, then the request to purchase is added to a queue associated with this DMO.

There are many ways for the remote server to match potential buyers with offers for sale of a DMO. Functionally, steps 220-224 describes what happens. For each non-empty buy or sell queue for some DMO, a check is performed to sell if the buy queue is non-empty 221 and if the corresponding sell queue is also non-empty 222. When both checks pass, an atomic transaction 223 is performed that (i) transfers funds between the buyer, seller, marketplace, and any other parties that get a part of the transaction funds, as well as (ii) transfers ownership of the DMO. The transfer of ownership is accomplished by atomically deleting the pointer in the seller's box to the DMO and inserting that pointer into the buyer's box. Both the buyer and seller are then informed that the sale has completed 224. The buyer can then, for example, download the DMO to his or her computer (e.g., in according with the discussion in connection with step 111, below), stream and/or share it, or otherwise exercise his/her rights as an owner consistent herewith.

In embodiments in which the a hardcopy form of the DMO has been sequestered (e.g., as described above in connection with step 45), ownership of that hardcopy form can be transferred from the seller to buyer along with transfer of the DMO itself. The transfer of hardcopy ownership can be effected as part of the same atomic transaction described above, as part of a separate atomic transaction is executed in parallel, or otherwise.

Following ownership transfer of the hardcopy, it can be physically transferred to the buyer (e.g., by mail, courier, in-hand delivery otherwise) for sequestration and/or it can be maintained by the same (or another) third-party who had performed the sequestration for the original seller. Indeed, in some embodiments, physical transfer of the hardcopy is only effected in connection with destruction of the corresponding DMO, e.g., as effected by the server 20 and/or management software 23.

In related embodiments, the DMO can be converted to a hardcopy format in connection with sequestration and/or upon physical transfer in connection with destruction of the DMO. The can be a same hardcopy format whence the DMO was originally converted or another hardcopy format. Examples include converting a DMO that had originally been in vinyl record format to CD format, converting a DMO that had originally been in celluloid movie format to Blu Ray format, converting a DMO that had originally been contained on a scratched DVD back to DVD format, albeit sans scratches. These and other examples are within the ken of those of ordinary skill in the art in view of the teachings hereof.

Such "conversion" of the DMO back to its original hardcopy format can facilitate playing of the creative content by users who prefer that original format. It can also facilitate the transfer of hardcopy embodying rare or expensive works (e.g., live concert bootlegs, turn-of-the-last-century movies, textbooks, encyclopedias, etc.) among enthusiasts and others, who borrow for evaluation—and then, if satisfied, buy—downloaded forms of such hardcopy, utilizing those downloaded forms until the hardcopy is received from the seller.

Indeed, in some embodiments, a DMO can be converted to a hardcopy format as described above—even if that DMO had initially been acquired in a downloaded format in the first instance, e.g., in step 40 (and not, instead or in addition, acquired in "hardcopy" form, e.g., in step 45), can be converted to a hardcopy format. A Recycled Digital Media Store A registered member of a recycled digital media "store" that operates according to the invention has numerous benefits. Members can access a catalogue of recycled, licensed, digital media. Music, movie, book and video game fans will enjoy their favorite artists, actors and authors showcased in a high-quality application that is easy and fun to use. The net result is a low cost unparalleled user experience and a compelling legal alternative to piracy.

Members can transfer unwanted digital media to the store in exchange for purchase credit. This media is re-inventoried in the store. A member can buy any media listed there with these credits. Such a system can provide the ability to get music, books, movies, and video games, other software, and/or combinations of the foregoing with no cash out of pocket. In some embodiments, if the account does not have sufficient credits to cover a purchase, the purchase can be completed in the traditional way, e.g., by credit card, etc.

Individual artist, author and producer areas allow members to build a direct relationship with fans, old and new, across the world. This service facilitates the development of revenue streams through the sale of downloads, merchandising, concert tickets and more, as well as, earning a share of the revenues created through advertising and premium businesses. Powerful, real-time, in-depth reporting is standard to participating labels and artists, authors, etc.

The Market for Digital Media has grown rapidly in the digital music space and is growing even faster with the introduction of digital movie downloads and digital books. Historically, all forms of media have moved to the "used" or "re-sale" marketplace.

Why re-sale? Typically the markets for resale are driven by VALUE, those purchasing in that category are most often driven by the ability to save money while getting the exact product they want, not an imitation, rendition or low quality copy.

Digital fingerprinting technology is used to identify and tag uploaded media, thereby securely removing all synced copies of the same file(s).

Embodiment

In some embodiments, management software (e.g., the aforementioned Manager Application 23) can run on a personal computer or laptop 22 that has connections to the internet 26. For example, there can be one or more remote servers 20 providing the service of purchasing, selling, inventory, and re-inventory of new and used digital media objects 28. There can also be remote servers that provide digital fingerprinting and identification services.

In some embodiments, a personal computer 22 can be used by a user to buy, sell, and/or manage his or her DMOs 28. Dedicated music players 32, movie viewers, e-book readers 34, game players, and the like, can connect to the personal computer 22 for DMO uploading and downloading. When each of these devices, e.g., 32-34, are attached to the personal computer 22, they can appear as a removable file system to the computer.

In some embodiments, the systems and methods of the present invention, e.g., the management software embodying the features disclosed herein, can run on portable digital devices, such as smart phones, or PDA's, or can execute on remote servers that control the content of dedicated devices. The modifications necessary to achieve these modifications are within the scope of this invention. An exemplary embodiment of which is described below.

For example, digital media objects can reside on "read-only" physical media, such as a CD, DVD, ROM, photographic paper, or physical book. They can also reside on more volatile devices such as RAM, disks, SSD, or flash memories. The digital data or bits of such volatile memory devices can be easily written or re-written many times. A digital media object can reside on any or all of these forms of data storage. Such data storage, especially flash memory can be found in all sorts of consumer devices. A single digital media object, say a digital song, can reside in a computers hard disk in one or more files, but can also reside in the flash memory of a portable music player, as well as on a backup disk drive or external flash memory.

In preparation to offer a digital media object for sale, the goal is to delete, expunge, remove, or disable all of the copies of this digital media object that are owned by seller so that there is only a single copy of the DMO whose ownership will be transferred during the sale. While it may be impossible to delete the copy of a digital media object that is stored on a disconnected, powered off disk drive, the management system software makes a best effort to remove all copies. To this end, the management system software preferably remembers the sale of this digital media object so that any time in the future, when a disconnected device is reconnected, the system will retry to remove it as well. A fingerprint of the DMO is used so that even if the metadata of a file containing the DMO is modified, it will still be recognized as a copy of the object sold or offered for sale. Similarly for portable digital music players; whenever they are connected to the computer, the manager will attempt to remove copies as well.

In the case of content that is initially acquired by the lawful possessor (owner) other than via a digital download but, rather, that is acquired in "hardcopy" form—e.g., a song that is acquired in vinyl album format or on CD, a video game that acquired on a game disk, a video that is acquired on DVD, a graphic and/or textual work that is in a printed book or magazine form, and so forth—the song, game, video, graphic/textual work and/or other creative content is first "burned" to digital form so that it can henceforth be used in embodiments of the invention in the same manner as downloaded content. To ensure that there remains only a single copy of that "burned" content, (i) its conversion to digital format is preferably performed "irrevocably" as discussed above and (ii) once converted to that digital format it is henceforth treated as the only a single copy of the DMO whose ownership will be transferred as discussed above and in the text that follows.

The working of an exemplary management system is described in two parts. The first part is the typical execution and assumes everything has been setup and initialized. The second part is the initial setup and handling other cases. The management system software runs on the private computer, smartphone, or other personal computing device. It communicates over the internet with the servers. The working of an exemplary server-side system is described as well.

Typical Operation

In one exemplary embodiment, the manager system uses the contents of several tables in order to know what actions need to be taken when a file is created, deleted, or modified. These tables are maintained on the local personal computer and can be mirrored on a remote server. When not in use, the tables are encrypted to prevent easy manipulation by rogue processes. Although not absolutely necessary, the private keys should be backed up on a remote server. In addition, the servers maintain a list of DMO's that have been bought or sold by the user. These lists are periodically sent to the management system software on the private computer to ensure they are up-to-date.

Figure 4:
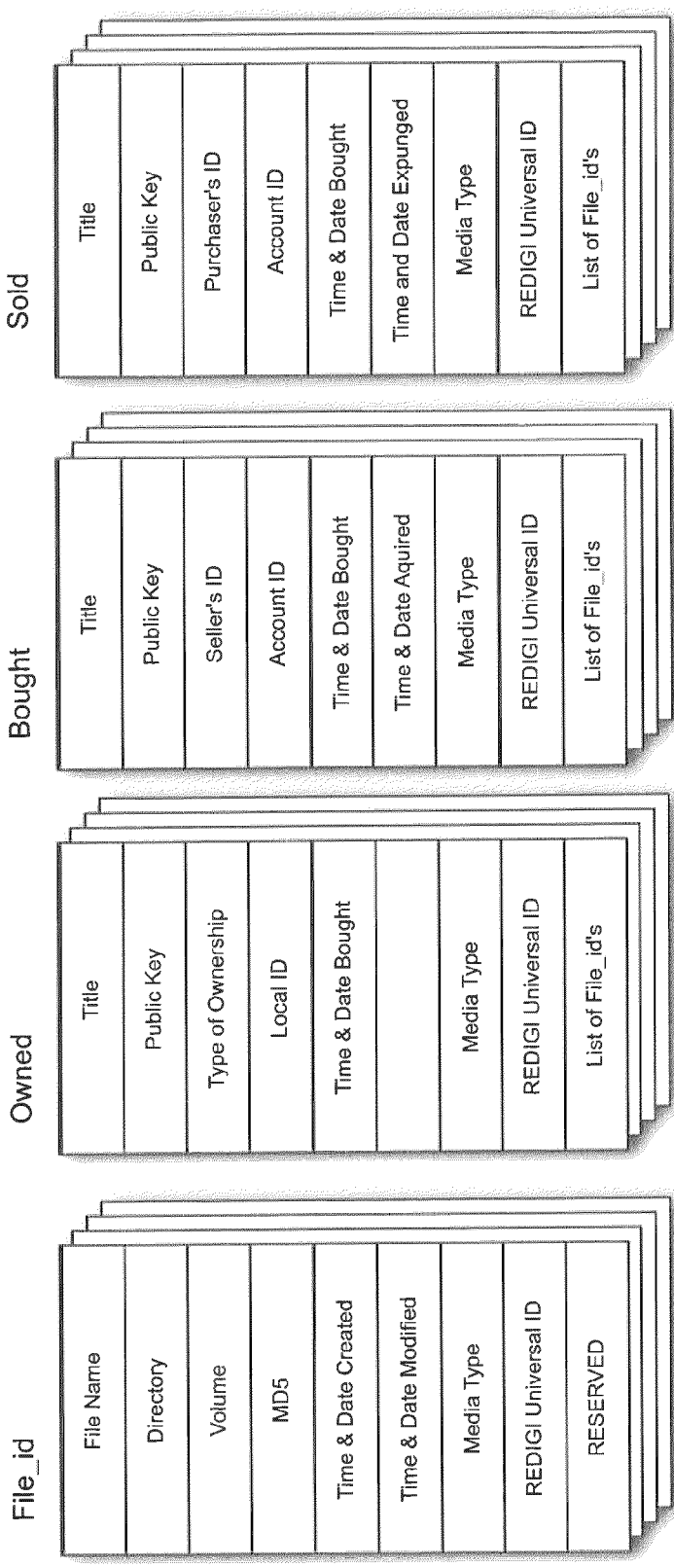
FIG. 4 depicts tables used by a system according to the invention in order to know what actions need to be taken when a file is created, deleted, or modified.

FIG. 4 specifies some exemplary fields for each entry in the table. Since files may be contained on external storage or storage contained within external devices or players (referred to as a volume), a complete specification of the file is needed. The ReDigi™ Universal ID is a globally unique ID and used to connect the file with entries in the other tables. The public key in the owned, bought, and sold tables refers to a way to decrypt the DMO. The entries in these three tables may contain a list of files that contain this DMO.

Each entry of the tables can contain the globally unique identity of the DMO. This is known to the remote server, which has a more detailed set of features and identifying markers for the object. Some objects can also have a decryption key. The entry for a DMO can also contain a fingerprint of the file, e.g. the MD5 sum as well as a list of files that represent or "contain" this DMO. It may also contain other identifying features that depend on the actual media type.

Some of the tables are as follows (see FIG. 4) for the fields of each entry in the tables:

file_id: This specifies a file. The file can be on the local machine or on a file system that is only temporarily attached. This other file system might be a dedicated device or an external drive, e.g. a flash drive.

dmo-owned: This is the set of DMO's that are owned by this user. Each could be contained in many different files on many different devices.

demo-sold: The set of DMO's that were sold by this user.

dmo-bought: The set of DMO's that were purchased by this user.

dmo-multiple-transactions: The set of DMO's that have been bought and sold multiple times. These entries represent files that should be watched.

dmo-suspicious: DMO's that have been sold but reappeared on the system

In some embodiments, whenever a file is created, deleted, or modified, a maintenance function of the management software is invoked. This invocation works in the same way as virus protection software. Under the Microsoft Windows operating system, it is possible to register a routine or service to be invoked on all these operations. Under the Macintosh Operating System, a similar mechanism exists for the file indexing service, "spotlight" If other operating systems do not provide this ability, then a periodic scan over all the files in the system can be performed in the background to detect the status off all the files.

In the Microsoft Windows operating systems, care is needed to avoid excessive invocation of this routine. When making a copy of a file, the routine will be called numerous times, as the new file is continually updated. Even worse is what happens when an entire directory, containing many files, is copied. To avoid numerous calls, a delay in inserted. It is not necessary for the management software to immediately check each new file creation or modification. All that is necessary is for each file to eventually be checked.

On each invocation the following actions occur. Note that the first action is to fingerprint the file using MD5 (message digest 5)—a hash value of the entire file. Thus, if the owner makes a copy of a file, we will be able to notice that the files are the same. In some embodiments an "acoustic fingerprint" or a "DMO specific fingerprint" can be used that will match DMO files even when the file is transcoded into a different format, e.g. a music file is converted from MP-3 to MP-4, the acoustic fingerprints of both formats will match.

|  | DMO-Owned | DMO-Bought | DMO-Sold | None |
|---|---|---|---|---|
| Creation | add to owned | increase count | delete file or issue warning | add to scanned |
| Accessed |  |  | delete file or issue warning |  |
| Deletion | remove from owned | decrease count | rescind any outstanding warning | add to scanned |
| Modification | treat as if delete then create |  | delete file or issue warning | add to scanned |
| Purchase |  | add to bought |  |  |
| Sell/gift |  |  | add to sold |  |

Actions in Response to a File Creation Notification

In some embodiments, since a user can make multiple copies of any DMO's that he or she owns, each copy should be recorded in the DMO-Owned or DMO-Bought table and checked against the DMO-sold. Although it is not necessary to record this information for DMO's that are owned, it makes the task of offering a DMO for sale much faster. If a DMO has been sold, the newly created file must be removed from the system either under management control or by issuing a notification warning the user that the DMO has been sold and the file must be deleted. The exception is when the user has access to a DMO but does not have sufficient computer privileges to delete the file. For example, when there are two users who share the same personal computer. Each user may be able to access files in the other's account but does not have permission to delete those files. Every modern, advanced operating system has a set of read, write, and deletion permissions associated with every file and every user account. Anyone skilled in the art of computer programming knows how to check these permissions.

A DMO file found on device that has just been attached is considered to be a file creation, and this discovery will be either recorded or deleted depending on it being identified as owned or sold. It is possible that the file creation is the result of a copy from a removable device containing that file, in such a case, both the original file and the DMO copy file must be deleted. If Non-DMO files or DMO files that cannot be validated as resulting from an on-line download purchase are ignored since they cannot be sold in the future and are assumed not to be part of the system of objects being tracked. A methodology for carrying out these steps is illustrated, by way of non-limiting example, in the code that follows,

```
def on_file_creation(file_id):
    (file_name, file_meta_data) = file_id
    if (dmo_id = contained_in_table(DMO_owned, file_id )):
        add_to_owned( dmo_id, file_id)
    elif (dmo_id = contained_in_table(DMO_sold, file_id )):
        popup_query_to_user-
            ("The_contents_of_the_object_in_file",
                file_name,
                "_has_already_been_sold\n_Will_remove_file.\n",
                "_If_this_is_in_error,_please_contact_re-digi.com")
        remove_file(file_id)
    else:
        add_to_files_scanned(file_scanned, file_id)
```

Actions in Response to a File Deletion Notification

In one embodiment, the response to a file deletion, does not depend on the number of copies of a DMO; the record of the deleted file associated with a DMO is removed and the count is decreased. When the count goes to 0, however, the DMO record remains in the table. If a DMO is owned it should continue to be tracked since it can be created again. For example, the file could have been deleted in order to save storage space. It could still be sold in the future. If the DMO was sold, then this deletion is just the right action to be taken. If the file was neither bought nor sold, it is not part of those that are tracked. A methodology for carrying out these steps is illustrated, by way of non-limiting example, in the code that follows,

```
def on_file_deletion(file_id):
    (file_name, file_meta_data) = file_id
    if (dmo_id = contained_in_table( DMO_owned , file_id )):
        removed_from_owned( dmo_id, file_id)
    elif (dmo_id = contained_in_table( DMO_sold , file_id )):
        decrease_file_count(dmo_id)
```

Actions in Response to a File Modification Notification

In one embodiment, a file that is modified can be treated as a deletion followed by a creation. There are optimizations but they make the code harder to understand and maintain. It is assumed that once a file has been modified, it is still possible to recreate the old, non-modified file. Actually, all that is needed is the fingerprints of the original file. This is already in the tables. A methodology for carrying out these steps is illustrated, by way of non-limiting example, in the code that follows,

```
def on_file_modification(file_id):
    old_file_id = temp_create_file_from_backup(file_id)
    on_file_deletion(old_file_id)
    on_file_creation(file_id)
    delete_file(old_file_id)
```

Actions Performed by the User Through the Management System

Before a DMO is sold, it must be checked for validity. It must be in the owned table. Then it all depends on the object type and its protection, drm, etc. A methodology for carrying out these steps is illustrated, by way of non-limiting example, in the code that follows,

```
# assume dmo_id is an entry owned.
# account is id of user (from whence it was bought)
def confirm_ownership(dmo_id):
    for file_id in file_list_in_owned(dmo_id):
        account = get_account_field_from_bought(dmo_id)
        # find at least one file with this dmo with valid ownership
        if (redigi_uid = get_redigi_uid_from_file_id(file_id)):
            if redigi_server_confirm_ownership( redigi_uid,
                account ):
                return TRUE      # remote server confirms ownership
            else:
                return FALSE     # server indicates different ownership
        elif known_standard_encrypted_file( file_id ):
            key = get_key_field_from_bought(dmo_id)
            (header_body) = decrypt_file( key, file_id )
            if account in header:
                return TRUE      # header contains correct account id
    return FALSE # could not confirm ownership
```

The confirm ownership routine is used when offering a DMO for sale. A methodology for carrying out these steps is illustrated, by way of non-limiting example, in the code that follows,

```
# dmo_id is a record that contains most of the fields in the dmo_owned
# table entry
def on_purchase(dmo_id):
    add_to_owned( dmo_id , null )
    add_to_bought( dmo_id , null )
# assume this is called only once dmo_id is confirmed
# to be in owned table.
def on_sell(dmo_id)
    if confirm_ownership(dmo_id) == FALSE;
        return FALSE
    add_to_sold(dmo_id)
    for file_id in file_list_in_owned(dmo_id):
        remove_file(file_id)
        removed_from_owned( dmo_id, file_id)
    return TRUE
```

A DMO that is purchased via the marketplace is easy to verify its ownership through a variety of mechanisms. In one embodiment, the DMO that is purchased is encoded with metadata and perhaps with a watermark that specifies the specific instance of the transaction. In the case of a digital song, an acoustic watermark encoding a specific globally unique instance id is embedded into the music encoding itself in such a way as to not be detectable by nearly all listeners. This is done by analyzing the music itself and varying the parts of the music that are not detectable by the human ear. Such encodings and decodings need only be probabilistic and encoded multiple times within the music to compensate for any individual false positives or false negatives. That is, if there is a ten percent chance of mis-decoding, then encoding twenty copies of the watermark in the sound, will make it highly likely for the watermark to be properly decoded.

When a DMO is stored in the box on the remote server, there is no needed for such watermarking Thus, the download manager on a user's private computer can do the encoding. The remote server sends the instance id as well as the song to the management software running on the personal computer. Before the song is stored on the computer, the management software encodes the watermarks as well as the instance id in the metadata.

Preventing or Discouraging Access to DMO that has been Sold

In one embodiment using the detection scheme described above, there are several actions that are taken to prevent or discourage access or use by a user of a DMO that the user has sold. For customers in good standing a warning message is flashed on the screen and a notification message issued is enough of a discouragement. The user may have simply not known that he or she still had access to a DMO copy that he or she has sold. Repeated access and playing of a song that the user has sold requires stronger action on the part of the management system. Since the identification might be in error, the file may be moved to a special quarantine directory making access difficult. Upon further infractions, the user is prevented from any further offers for sale of DMO's. An even further discouragement is possible by freezing the user's account.

Initialization

In some embodiments, the initialization phase goes through all the files owned by the user and classifies their content and places these results in a set of tables. For example, this is similar in function to virus detection software. It first does a full scan of all the files. Later, it is only concerned with new and modified files.

In one exemplary embodiment, when a new file system or file volume is attached to the computer, the initialization routine scans though all the files on it. Thus, the initialization phase may be invoked many times (as devices attach and reattach).

Exactly which DMO's found in files are classified as "owned" is a policy decision. A liberal policy is to assume every DMO was legally acquired. A highly restrictive policy assumes that only DMO's with DRM that restrict playing to this device are legally owned and all others are not and may not be resold.

A methodology for carrying out these steps is illustrated, by way of non-limiting example, in the code that follows,

```
# This examines a file
def scan_file(file_id):
    (file_name, file_meta_data) = file_id
    if is_redigi_file(file_name):
        dmo_id = extract_dmo_id(file_name)
        add_to_owned( dmo_id, file_id, 'redigi' )
    elif is_ordinary_media_file(file_name , media_type):
        header_info = extract_header(file_name)
        dmo_id = looup_object_from_header_info( header_info)
        add_to_owned( dmo_id, file_id, 'ordinary' )
    elif guess_media_type( file_name ) == media_type:
        dmo_it = guess_dmo_id( file_name)
        add_to_owned( dmo_id, file_id, 'guessed' )
    else:
        add_to_ignored( file_id)
    add_to_scanned( file_id)
```

The Server Side

The management system software communicates with the remote server software. A web browser can also be used to communicate and interact with the remote server software.

The server controls and maintains a set of databases that are used to support various functions such as: user accounts, DMO maintenance, deep verification, bookkeeping of credits and financials, uploading and downloading of DMOs, and matching offers to sell with requests to buy particular DMOs.

Maintaining user accounts is required for the system to work but the particulars, such as account creation, verification, login, session-ids, cookies, etc., are well known. What is relevant to one embodiment is the additional information kept with the account, outlined below, in a way of a non-limiting example.

| Field | Description |
| --- | --- |
| Preferences | The length of time a DMO that has been offered for sale will remain for sale or an offer to buy will remain in place. When the purchase of a DMO succeeds, the DMO can be automatically downloaded to one or more of the user's private computer or devices. |
| Box Size, Box capacity, Box location | The box is a collection of the DMO's owned by the account and currently residing on the server dedicated to the exclusive use by this account. There is a capacity both in the number of DMO's and in their total size. |
| DMO identities used | This field is used to detect fraud. DMO's purchased on-line often have an identify, email, username, or some other customer identification stored in the meta-data. A user who has an excessive number of such identifies is a warning signal of potentially trying to sell DMO's that he or she does not own. Similarly identities that are also found in other user accounts raise similar warnings. |
| IP addresses of machines with management system software | Each machine with a working cop of the management system software can download a copy of a purchased DMO. Consequently, the server limits the number of machines on which the management system software installed. Also monitored is the number of times the management software is installed and uninstalled. |
| Number of Infractions | An infraction is a violation of the legal use of the system, such as non-deletion of DMO's offered for sale, multiple attempts to offer non-verifiable DMO's for sale, or exceeding the limits of identities or machines as recorded in the above two fields. |

The BOX

In one embodiment, DMO's can be uploaded to or downloaded from the server. A table containing pointers to the DMO's is referred to as a box. Each DMO is owned by used one user and at any time, there is only one box that points to a DMO. There are several operations that can be performed on a box, including those in the following list:

| | |
|---|---|
| statusOfBox( ) | This returns the objects, their type, size, and status - for sale, recently purchased, exclusive copy (e.g. there are no known copies on any of the user's devices or machines). |
| putFileIntoBox( file, nickname ) | The management system software uses this interface to upload a copy of a DMO to the server. |
| getFileFromBox ( nickname ) | The management system software uses this interface to download a copy of a DMO. The server then records the fact that this DMO is no longer exclusive on the server. This is also used when a DMO is purchased from another user. |
| insertFileIntoBox( nickname ) | This is part of the process of transferring ownership from one user to another. In one atomic transaction, a pointer to an instance of a DMO is deleted from one box and inserted into another box. |
| deleteFileFromBox( nickname ) | This is part of the process of transferring ownership from one user to another. It can also be invoked from the management system software. |

DMO Verification

In one embodiment, verification of a DMO offered for sale is necessary in order to ensure that the meta-data that identifies the contents of the DMO is correct. There are two aspects to the verification process. One is to verify that the DMO was purchased by the user. The second is that the digital object is what it claims to be. For example, a devious user may try to sell a song that appears to be the Beatles' song "Yesterday" but when played, the music is an advertisement for some product.

In one embodiment, verification of ownership is based on a set of criteria and characteristics of the DMO, each of which either increases or decrease the level of confidence in ownership. Some, but not all characteristics are:

| | |
|---|---|
| User identification | Many sites store one or more versions that identify the user account that did an on-line purchase of the DMO. If this user identification matches those of other DMO's owned by this user, then increase confidence of ownership. If the user identification is similar to the user account name on this seller, then also increase confidence. For example, if the user name for an iTunes purchased song matches the user name of the reseller's account name for this service, give extra bonus in confidence. |
| Exclusive use of identification. | There are no other users in the system that have ever had a DMO with this user identification. |
| No obvious signs of metadata editing | Many programs allow one to edit the metadata of a DMO Some of these programs add fields to the metadata that state the program used to edit the metadata. |
| Valid proprietary fields inserted by the distributor | Many online DMO retailers insert special hidden fields to show that they sold the file. Examining a large number of DMO's can be used to identify their special hidden fields. |

Upon transfer of ownership of used DMO's that are sold through the service are stripped of all identifying marks and fields in the metadata. The new owner will not be able to tell who was the previous owner. Then, identifying marks of the new owner is inserted into the DMO metadata. Finally, special watermarks identifying this transaction and this service provider are inserted into the DMO itself. For example, in the case of a digital song, a digital watermark is inserted by modifying the music in an inconspicuous manner. In one embodiment, all these steps are done by the management software on the user's private computer when a DMO is downloaded.

A DMO that was purchased as a used DMO through this service will thus contain a recognizable watermark, perhaps acoustic in the case of songs and movies or graphical in the case of e-books, video games and other software or pictures and/or combinations of the foregoing. Any DMO containing such watermarks can be easily verified as to the true owner of the DMO making verification of such DMOs very easy and straightforward.

The second type of verification, that of ensuring the meta-data correctly identifies the content of the DMO, can be accomplished, in one embodiment, by the use of a master fingerprint table. Each instance of a DMO contains a copy of the same contents as the master copy. For example, the music of any instance of the same digital song should sound the same. We assume that different encodings of the same DMO contents sound, look, or render in a similar way. A fingerprint of the content is stored on the server. Every work offered for sale is verified as follows. A fingerprint of the content is generated. This fingerprint is compared to the fingerprint on file in the server of the work that corresponds to the work's identification as specified in the metadata. For example, if the metadata of a song claims it is the Beatles' song "Yesterday" then a acoustic fingerprint is generated of the music in the DMO. This fingerprint is compared to the fingerprint that was generated from a known valid DMO of the same song. The fingerprint need not match exactly, but should be close enough. Note that this task is significantly simpler than the task of identifying a DMO without knowing what it is. For example there are many services that can identify a song from just a few seconds of its playing. That requires comparing the fingerprint of a few seconds of music with an entire collection of millions of songs. There are many ways to generate fingerprints. A common approach is to apply a Fourier Transform to the signal mapping it from the time domain to the frequency domain. Characteristics of the resulting frequencies, such as max, min, average values, signal entropy can be used along with other more typical music features such as timbre, The verification task using fingerprints is much easier than identification since it need only ensure that the fingerprint match the fingerprint of what the DMO claims to be.

The Matching

In some embodiments, the matching between DMO's offers for sale and request for purchase consists of the following actions making by the servers and making use of its internal tables. A DMO can be offered for sale before, during, or after there is a corresponding request for purchase. Consider each case separately. Before delving into the details, it is necessary to describe how a DMO can be identified.

In the case of digital songs, each song requires a unique representation. A song is often identified by a quadruple of Title, Artist, Album, and Year released. Unfortunately, not all songs fit this identification model. Some songs are released as singles and are not associated with an album. Some songs may have multiple release dates. Yet other songs may have slightly different ways of writing the title, depending on the language of the consumer, e.g. A French as well as an English title, or a title that is transliterated using a different alphabet. In addition, classical music may be specified by both the orchestra and the conductor.

In some embodiments, a standard database is used that provides a unique number or identifier for each unique musical composition. The database can be searched using a partial specification of the object and can also assign the same identifier to the same musical composition even when there are multiple titles, release dates, etc. Given a DMO, the metadata must specify these fields in sufficient detail to uniquely identify the object. These fields are used as search terms for the database. Any DMO offered for sale, will first have these fields extracted from the metadata, a search performed on the database, and its unique identifier then used as an internal DMO identifier.

When a DMO is offered for sale before there is a request for a purchase, the server updates the available inventory for this particular object based on its identifier as described above.

A buyer will specify some or all of the search terms. This produces a list of identifiers that match the search terms. For each of these identifiers, a list is presented to a potential buyer with a notation of which objects have non-zero inventory. When the potential purchaser indicates a willingness to buy the used DMO, the inventory is searched and an atom database transaction will exchange coupons, credits, cash, as well as exchanging ownership.

There may be items on the list that have no inventory but that a user wishes to purchase. This is a case of a buy request occurring before an offer to sell has been made. The inventory table entry for this object indicates this fact. As soon as there is an offer to sell this object, the server checks the inventory and will see the request to buy. A match occurs and an atomic database transaction will exchange coupons, credits, cash, as well as exchanging ownership.

The third possibility is that there are no requests to buy nor offers to sell for a particular object but at roughly the same time, a request and an offer are made by two different users. A naïve implementation could result in a situation in which the offer to sell fails to see that there is a request to buy and the request to buy fails to see the offer to sell and both get placed in a wait queue and no match occurring until some future request or offer is occurs. Note that the buyer has already seen an empty inventory and so is expecting to wait for an offer to sell. So, whenever a request to buy is placed in the wait queue, a timer is set so that the request to buy will check the sell queue again in the near future. This ensures that a match will always occur no matter what the timing.

Gifting

In one embodiment, an exchange of ownership and corresponding monetary instruments can take place between three users, when there the transaction supports gifting. The match process described above involves a database atomic transaction that atomically performs several database updates. The pointer to the DMO is switched from one user's box to another user's box. The price of the DMO is subtracted from one user's account and added partially to another user's account and the remaining to the media store's account. To support the ability to gift a DMO, the atomic database transaction involve the database accounts of three user's in a manner that will be evident to those skilled in the art in view of the teachings hereof.

Increasing the Chance of Matching

In some embodiments, provisions are made to give a seller a better chance to have his or her DMO's bought. One way is to help the seller to offer the DMO's in the right time. There are three subsystems.

One subsystem uploads DMO's to the box, purges them from the private computer, and then offers them for sale. This process can be under direct control of the seller. But if the seller wishes to offer many DMO's for sale and there is insufficient room in the box for all of them, some of this process can be automated.

The user specifies all the DMO's that are offered for sale using a second subsystem. This subsystem sends the list to the server. Any DMO's for which there are buyers waiting, are automatically uploaded to the box, purged, offered for sale by making use of subsystem one, however under the control of subsystem two. If there is still room in the box, DMO's that have been recently been involved in transactions and then offered for sale, again sing subsystem one. The server knows current and past demand and can accurately priority order the DMO's so that the most likely ones to be bought are the first to be offered for sale.

Based on the set of DMO's offered for sale (accumulated via subsystems one and/or two), it is possible to infer what other DMO's a user may have on his or her private computer. Correlating these with known demand of requests to buy, a third subsystem can send a list of DMO's to the management system software on the personal computer to see if there are any DMO's there. If so, the user is asked if he or she would like to offer them for sale. This works in much the same way as a recommendation system, however, it is based on what a user wishes to sell rather what the user wishes to buy.

Optimizations

Optimizations of the foregoing are discussed below. These may be employed individually and/or in combination with one or more of the teachings above.

The file size can be an easy filter to quickly eliminate files from consideration. Movies are at least dozens of megabytes in size. Songs are smaller. E-books are not dozens of kilobytes in size. Pictures usually larger.

The file extensions can be an excellent first level indicator but should never be trusted. It identifies the first thing to try.

The tables are best organized as hash tables to quickly find records. When more than half the entries are occupied, the table size can be doubled and the entries re-mapped.

Rather than uploading a DMO that is sold, in some situations, it may be sufficient to simply notify the remote server by sending the ID of the object. This can be considered a highly compressed version of sending the whole object.

When several users upload the same DMO to the server, it may be possible for the server to store only a single copy of the DMO and have each user's box point to this single copy. It is a legal decision whether or not the server must maintain distinct instances of each DMO.

To identify the DMO contained in a file, there are three cases to consider: The file is encrypted in its original form. The file is unencrypted and unmodified. The file is unrecognized and requires more elaborate fingerprinting.

The match is much easier since the database size is smaller than the usual complete contents. The match is against only those DMO's that have been sold. Two steps: when sold and when any file is created for first seen, e.g. device is connected.

When scanning all files. For each file, do deep search (fingerprint) to have table of owned objects and the files in which they reside. (can do this lazily) Whenever a new drive or device is connected, do a deep scan Maintain fingerprint (features) in the owner table (or even unclassified table). When an object is offered for sale, we download the features and match it against all the objects in the table. It is easier to match a particular song rather than to identify the song.

Further Illustrated Embodiment

Figure 5:
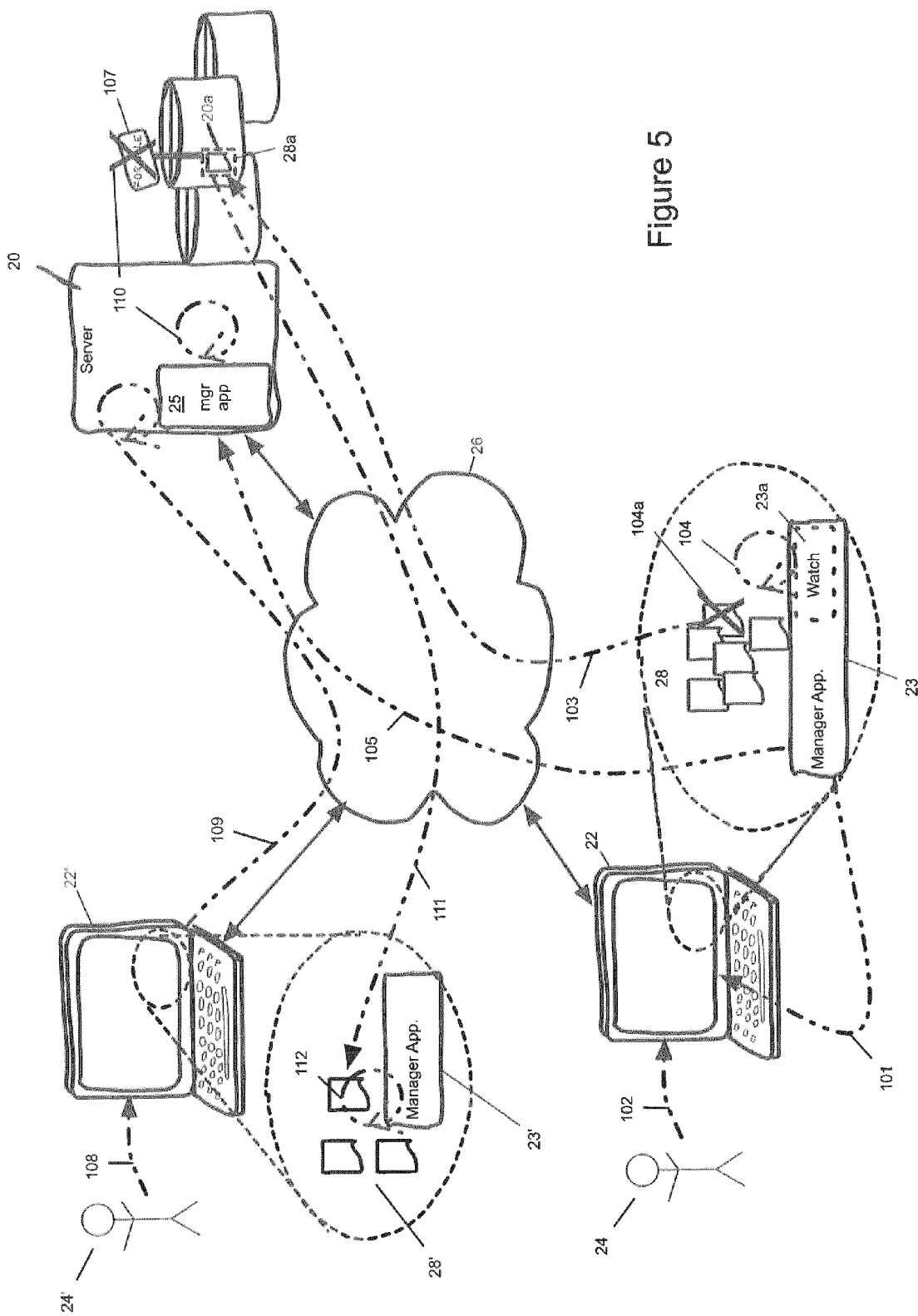
FIG. 5 depicts a system of the type shown in FIG. 2 processing a music file (or other digital media object) in accord with the steps shown in FIGS. 3A-3B.

A system of the type shown in FIG. 2 that processes a music file (or other digital media object) in accord with the steps of FIG. 3A is depicted, by way of recap, in FIG. 5. For simplicity, like reference numerals are used in the latter (vis-a-vis the former) to refer to like elements. Thus, for example, element 22 of FIG. 5 corresponds to element 22 of FIG. 2, and so forth. Steps performed by the illustrated elements are designated by numbered arrows (e.g., arrow 101, arrow 102, etc.). In the discussion that follows, as well as throughout this document, the term "computer," "private computer," and so forth, refers to digital data devices amenable to operation in accord with the teachings hereof. This includes personal computers and laptops, as well as netbooks, tablet computers, smart phones, PDA and portable music players. It can also include gaming devices, such as PlayStations, and the like.

Step 101

Referring to FIG. 5, the management software 23 generates a user interface (e.g., on a display associated with computer 22) identifying music files and/or other DMOs on computer 22 (and on any associated devices 32, 34 coupled thereto) eligible for uploading to server 20, e.g., for possible sale. This can be based on an inventory of files already "known" by software 23 to be present on the computer 22 and/or by a searching of all or selected directories of the computer 22 (and, to the extent possible associated devices).

In the illustrated embodiment, eligibility is based on the validity checks of the file that can include examination of, e.g., the title of the song or other content of the file, the distributor or other source from where it was originally downloaded (e.g., Amazon, iTunes, etc.), the ID of the purchaser to whom it was originally downloaded, all as determined, by way of non-limiting example, from MP3 tags or other metadata associated with the file. In other embodiments, such checks can be based on other factors, as well or in addition, such as, the digital "fingerprint" of the song or content of the file, the ID of the user operating the computer, public or private keys associated with the user account and/or the song or other DMOs, etc. That other information may, too, be obtained from tags or other metadata associated with the file and/or it may be obtained from registries, libraries or other stores maintained on computer 22 or elsewhere (e.g., on server 20)

The management software 23 can list eligible music files or other DMOs in the user interface in boldface type and/or with other indicia of their eligibility and/or potential sale value. It can list non-eligible files (e.g., in some embodiments, music files copied from CDs, files of dubious or non-allowed origins, etc.) in light type or other indicia of non-eligibility.

The generated interface can also list, for example, files previously uploaded by the user to the server 22 and currently maintained there on behalf of the user for sale or otherwise.

Step 102

The user utilizes the user interface, e.g., via a keyboard, mouse, touch screen or other input device, to designate an eligible music file(s) or other DMO(s) to upload for sale.

Step 103

The management software 23 operates in conjunction with management software 25 on the server to upload the designated music file(s) or other DMO(s), here, designated as 28a, to an area 20a allocated on a disk of server 20 to the user.

Step 104

The management software 23 scans the computer 22 (and on any associated devices 32, 34 coupled thereto) for copies of the uploaded file(s). This can be done prior to, at or just after the upload, and it is followed in the illustrated embodiment by a watch (here, designated by function block 23a) for future copies. As denoted by "X" 104a and as discussed elsewhere, a goal is to delete, expunge, remove, or disable all of the copies of the uploaded file that are owned by user so that the uploaded file is only one in existence that in possession of the user. This can be achieved by deleting any present copies of the file on computer 22 and "remembering" the file so that any future copies that appear (e.g., when a disconnected device is reconnected) can be detected by the "watch" 23a and can be deleted as well (unless, of course, the user rescinds sale of the file and/or repurchases it). And, it can include using a fingerprint of the file so that even if its metadata is modified, it will still be recognized as a copy of the uploaded DMO.

Step 105

The management software 23 confirms that all local copies of the uploaded file have been deleted and that a watch is in place to delete future copies.

Step 106

Following upload, the management software 25 on the server performs additional validation checks. While these can duplicate some or all of the checks performed on the file prior to upload (see step 101), typically, the checks performed in this step include more processor-intensive, data-intensive, or other checks of the type not desirably performed on the private computer 22. In a preferred embodiment, for example, the management software 25 extracts a digital "fingerprint" of the file for logging and/or for comparison with know fingerprints (a) of commercially available music files or other DMOs of the type which the upload purports to be and/or (b) of music files or other DMOs previously uploaded by the same user. As above, the checks performed in this step can be based on the MP3 tags or other metadata associated with the file, on the content of the file, the ID of the user, public or private keys associated with the user account and/or the DMO, etc.

Step 107

If the upload file passes all validity checks, it can be offered for sale and the management software 25 updates its database of on-sale titles, etc., for matching with requests by buyers. Otherwise, the preceding steps are reversed (to the extent feasible), and the file is removed from the server and reinstated on the computer 22.

Step 108

Management software 23' executing on the private computer 22' of another user 24' generates a user interface (e.g., on a display associated with computer 22') listing music files and/or other DMOs available for sale on server 20. This is based on an inventory of on-sale files transmitted by the server 20 to the software 23'. It can also include a listing of files 28a owned by user 24' that, themselves, are on-sale on the server 22, e.g., in the event the user 24' choses to rescind a prior offer for sale.

Step 109

Management software 25 accepts from management software 23' or other sources (e.g., directly attached web browsers, third-party services, etc.) a request to buy a file listed in the database of on-sale titles. The management software 25 validates the request, e.g., by confirming that the requested title is available in sufficient quantity, that the buyer has funds or credits sufficient to cover the purchase, and checking that he/she has an account on the server.

Step 110

If the validation succeeds, the management software 25 executes an atomic transaction to effect the sale. As discussed above, this includes atomically reallocating to the new owner the area 20a on the disk allocated to the previous owner to store the file 28a. Optionally included in the atomic transaction is delisting of the file from the on-sale databases, although, this step can be performed separately. As noted above, such reallocation avoids the necessity of copying or moving the DMO on the server. Thus, there is only a single DMO before, during and after the sale transaction.

Although not necessarily performed in the same atomic transaction, this step also includes appropriately debiting and crediting the buyer's and seller's accounts for the sale price, along with transaction fees, taxes, etc.

In embodiments wherein the management software 25 sets limits on disk space allocated to registered user, the buyer's and seller's accounts are updated to reflect the transfer of allocated disk space. Thus, for example, the buyer's account is updated to reflect that a quantum of disk space otherwise available to it is now consumed by the purchased file. Conversely, the seller's account is updated to reflect that additional quantum of such space is available to the seller.

Step 111

Following transfer of ownership, the management software 25 allows the new owner to transfer the file 28a to his or her computer 22' and, following that transfer, deletes the file from the server disk—thereby freeing up additional disk space for that user on the server 20. In some embodiments, the management software 25 permits the user to download multiple copies, e.g., typically up to the industry standard of five downloads. In those embodiments, the management software 25 logs each download and delays purging of the file from the server 20 until the maximum number of downloads have occurred. While the downloads must typically be to a computer 22' associated (by account id, CPU code, or otherwise) with the new owner 24', in some embodiments, they may be to accounts of affiliated users (as reflected, for example, in databases maintained by software 25 on server 20) or others, as well, as discussed below.

Step 112

Upon receipt of a downloaded file 28a, the management software 23' on the buyer's computer 22' allows the buyer to update the metadata, e.g., to reflect that he/she is the current owner of the file and/or to update the name of the distributor.

Access Control

As will be appreciated by those skilled in the art in view of the discussion above, the server (and, particularly, for example, access management software 25 executing on it) selectively permits the first owner of an uploaded music file or other DMO to access the file (while simultaneously prohibiting all others from such access) and, subsequently, prohibits the first owner from such access, while affording such access to a second owner. Because of the atomic nature of the ownership transfer transaction, there is no period of time when both owners have access to the file or a copy thereof.

Lending

In some embodiments, systems of the type described above utilize these same mechanisms to permit temporary borrowing of a music file or other DMO uploaded to the server 20. Such embodiments utilize the very mechanisms described in steps 100-112, above, sans the crediting/debiting of funds and/or coupons in step 110, in order to effect a loan of the DMO from the first "owner" 24 to the second "owner" 24'—and, likewise, to effect return of the borrowed DMO from the second "owner" 24' to the first "owner" 24. As those skilled in the art will appreciate, the term DMO is used in this section and those that follow (unless otherwise evident from context) to refer to a digital media object or a copy thereof.

In some embodiments, the management software 25 executing on the server can cooperate with management software 23' executing on the second owner's computer 22' to effect a forced return of the borrowed DMO, e.g., at the request of the first owner, after a predetermined time period, or otherwise. Time-based return can be useful, for example, where the first owner is a library and the second owner is a library patron.

To facilitate subsequent acquisition by the borrower 24' (here, the second "owner") of his/her own DMO embodying the same song, book, video, computer game or other creative work as the borrowed DMO, the management software 25 executing on the server and/or that 23, 23' executing on the lender's and/or borrower's computers 22, 22' can convey to (e.g., by email, text messaging or otherwise) and/or deposit on (e.g., by action of the local management software or otherwise) the borrower's computer 22' a link or other indicia of the work and/or a source from which such a DMO can be bought or otherwise acquired. This can be a textual, graphic or other identifier of work (e.g., title, and/or album or book cover art, etc) and/or retailer from which it can be acquired. Preferably, however, it is or includes a link to an online retail store that sells the DMO and, more preferably, a link to a catalog entry at that retailer for that DMO and, still more preferably, a link to a catalog entry at a retailer that permits acquisition of the DMO from a prior owner thereof in accord with the teachings hereof. By way of non-limiting example, in systems where the borrower 24' plays digital media objects via an application (executing on computer 22') that lists digital media objects already in that borrower's 24' possession, e.g., in the form of a "library," the aforementioned link or other indicia can be listed as an element of that library, albeit "grayed-out," indicating that the object needs to be acquired by borrower 24' before he/she can play it as part of his/her regular library.

In some embodiments, management software 25 executing on the server and/or that 23, 23' executing on the lender's and/or borrower's computers 22, 22', monitor for acquisition by borrower 24' of a DMO borrowed from the owner 24', e.g., as discussed above. If/when that occurs, the software 25, 23, 23' and/or other functionality operating on the system credits the owner's 24 account, e.g., entitling him/her to reduced pricing on a subsequent acquisition of his/her own. Other embodiments may reward the owner in other ways and/or may place limits on such awards (e.g., crediting the owner 24 only if the borrower 24' acquires the DMO within a specified period of time, etc.)

Streaming and Sharing

The management software 25 permits music files and other DMOs uploaded to server 20 to be streamed to the owner and, in some cases, to others as well.

It supports streaming to the owner by permitting his/her computer (22 or 22', as the case may be) to "play" the uploaded file 28a using suitable software applications (e.g., Windows Media Player, iTunes, Kindle app, iBooks, and so forth) and/or via suitable output devices (e.g., loudspeakers, digital media streaming boxes, video monitors, and so forth). This is accomplished in the same manner as playing such a file 28 that is stored locally to the computer, albeit, with a file 28a that is sourced from the remote server 20. As above, this can be effected via access to and transfer of the file 28a using conventional streaming protocols (e.g., RTSP, HTTP, Unicast and so forth) and corresponding client/server interface components operating on the computer 22 or 22' and server 20, respectively—with management software 23, cooperating with the respective interface components and/or the file systems of the respective devices 22, 20, as necessary—or via such proprietary protocols and/or interface components as may be realized by those skilled in the art. As an alternative to streaming, the management software 25 can work with interface components and/or management software 23, 23' on the server and owner computer 22, 22' to download the file 28a or portions thereof for streaming-like playback. For simplicity, this is referred to here as "streaming," as well.

In some embodiments, the management software 25 permits streaming to and sharing by others, as well, using mechanisms similar to those discussed above. Thus, for example, it permits computers of users whose accounts are affiliated with the owner 24, 24' to access and transfer a file 28a for streaming play on suitable software applications and/or via suitable output devices associated with those computers. Such access can be limited in number, frequency, by password, etc., as desired or necessary. Thus, for example, the management software 25' can impose a policy that affords a given owner 24, 24' a right to grant access to a given file 28a for streaming play by affiliated users only a limited number of times per day, week, month, or other period or by only a limited number (e.g., five) of such affiliated users at a time.

And, by way of further example, in some embodiments the management software 25 permits even streaming to and sharing by computers of users that are not affiliated with those of the owner (or, more aptly, whose accounts are not affiliated with that of the owner). This can based on geographic and/or "network" proximity, by way of non-limiting example. Thus, for example, the management software permits computers that are within the same network "zone" (e.g., LAN or subnet) as the owner's computer 22, 22' to access and transfer a file 28a for streaming play on suitable software applications and/or via suitable output devices associated with those computers.

Though a zone can be defined by network or subnetwork, it is preferably defined instead or in addition geographically. Thus, for example, in some embodiments, the management software permits computers that are within a specified radius (e.g., 25 feet) of the owner's computer 22, 22' to access and transfer the file 28a for streaming play. Such distances can be determined, e.g., by GPS (or other positioning) devices onboard the computers, by network access point triangulation, by cell tower triangulation, by detection of a common Bluetooth or other radio frequency signal, and so forth. Alternatively, or in addition, the management software can permit streaming to computers within a geographic zone that is defined by geophysical structures (e.g., permitting streaming to computers on the same beach or hill), architectural structures (e.g., permitting streaming to computers in the same building or on the same plaza), metropolitan spaces, and so forth. As above, access by computers of users regardless of owner affiliation can be limited in number, frequency, by password, etc., as desired or necessary.

As above, to facilitate subsequent acquisition by the affiliated or unaffiliated users to their own respective DMOs embodying the same song, book, video, computer game or other creative work as the streamed/shared DMO, the management software 25 executing on the server and/or that executing on the owner's and/or affiliated users' computers can convey to (e.g., by email, text messaging or otherwise) and/or deposit on (e.g., by action of the local management software or otherwise) the affiliated users' respective computers' links or other indicia of the work and/or a source from which such a DMO can be bought or otherwise acquired. As above, this can be a textual, graphic or other identifier, a link and, preferably, a link to a catalog entry at a retailer that permits acquisition of the DMO from a prior owner thereof in accord with the teachings hereof, e.g., displayed as a "grayed-out" library entry or otherwise unless/until acquired by the affiliated or unaffiliated user, as discussed above). And, as above, in some embodiments, management software 23, 23', 25, and/or other functionality operating on the system, responds to the subsequent acquisition by the affiliated or unaffiliated users of their own respective DMOs embodying the same song, book, video, computer game or other creative work as the streamed/shared DMO, by crediting the owner's 24 account, e.g., entitling him/her to reduced pricing on a subsequent acquisition of his/her own. And, again, other embodiments may reward the owner in other ways and/or may place limits on such awards (e.g., crediting the owner 24 only if the borrower 24' acquires the DMO within a specified period of time, etc.)

As noted above, the term DMO as used in this section refers to a digital media object or a copy thereof unless otherwise evident from context.

Playlists

As evident in the discussion above, private computers 22, 22' can include software applications suitable for "playing" locally stored music files and other DMOs 28 selected by the owner 24, 24' individually, in playlists (i.e., a list of songs or other works to be played in sequence, randomly or in some other order), or otherwise. Such software can be, for example, of a type known in the art, as adapted in accord with the teachings hereof. That same software (and/or associated management software on the computers 22, 22') can request from server 20 and, more particularly, for example, from management software 25 access to music files or other DMOs 28a stored on server 20 for streaming as discussed above, again, selected individually, in playlists or otherwise.

In embodiments that permit streaming to multiple users (e.g., affiliated users and/or users in proximity, as discussed above), the management software 25 executing on server 20 can work in cooperation with that executing on the users' computers and/or with their respective DMO playing applications (and/or aforementioned interface components and/or the file systems of the server 20 and/or respective user computers, as necessary) to permit the owner 24, 24' and/or other users to concurrently play music files or other DMOs on shared playlists (i.e., playlists that are shared among and between the owner and/or others). Indeed, while those shared lists are normally stored on the owner's and other users' respective computers, in some embodiments the lists are maintained on less than all of those computers and/or on the server 20 and/or by the management software 25, for convenience or otherwise.

In embodiments where such concurrent play of shared playlists is permitted, access by computers of multiple users can be limited in number, frequency, by password, etc., as desired or necessary—as discussed above. Alternatively, or in addition, the management software 25 can work in cooperation with the foregoing (e.g., management software in the owner/user computers, the DMO player applications, interface components, and/or file systems, etc.) to (a) phase playing of the songs or other works on the playlists so that those limits (esp., for example, as to numbers of users simultaneously playing a song or other work) are not exceeded vis-a-vis the music file or other DMO of the owner who shares the playlist, and/or (b) effectuate lending from other owners of their respective music files or other DMOs in order to allow the (aforementioned) owner and the others who wish to concurrently play his/her playlist.

In regard to (a), e.g., in an embodiment that permits no more than one listener at a time, the management software 25, etc., insures that it is never the case that two people are being streamed the same song instance at the same time. During the time period when a particular song instance is played, it is owned by the listener. As soon as the stream ends, ownership is transferred either back to the original owner or to the next user in line for listening to the songs on this playlist. Indeed, by using a DMO player that does not support a pause operation, the system can know exactly when ownership will transfer, e.g., a few seconds after the duration of the song. When several users wish to share the same playlist, the system can skip over songs in the playlist for one user to ensure the exclusive ownership requirement. Thus, more than one user can listen to the songs on a playlist, provided the same song is not played (or owned) by two listeners at the same time. If a song is not available, it is simply skipped and the next song in line can be played. Using the teaching described above, the system can ensure this provision. The playlist dictates the sequence of songs to be played.

In regard to (b), e.g., again, in an embodiment that permits no more than one listener at a time, it is possible that there are several copies of the same song available for sale throughout the system. In such a case, several users can listen to the song at the same time, provided the total number of listeners does not exceed the total number of copies of a particular song. During the period of time that a song is being played, it cannot be sold. However, as soon as its ownership returns to the user that offered it for sale, the sale transaction can occur and that song is then not available for sharing.

As noted above, the term DMO as used in this section refers to a digital media object or a copy thereof unless otherwise evident from context.

Transferring Individual Songs, Etc.

In some embodiments, systems of the type described above utilize the mechanisms discussed above to permit the lawful possessor of creative content to sell a DMO representing just a portion of that content, while retaining at least a passive interest in the remainder of that content. Such embodiments permit, for example, the owner to sell a DMO embodying a single song from an album, an article or chapter from a book (or other text), a scene from a video/movie, an episode from a TV series, and so forth, while retaining the remainder of the creative content.

Depending on implementation, that retained content can be retained in the form of a DMO (or DMOs) in which the original lawful possessor retains an active interest—that is, which the original lawful possessor plays and/or that he/she sells, lends, streams, shares to/with others or otherwise utilizes as described above independently of the portion sold to the other.

Alternatively (or in addition) and, again, depending on implementation, that retained content can be retained in a hardcopy format (e.g., a hardcopy format, if any, in which it was originally acquired by the original lawful possessor or some other hardcopy format) in which the original lawful owner retains only a passive interest—that is, in which the original owner retains an equitable interest, but which he/she does not play, nor that he/she attempts to sell, lend, stream or share to/with others or otherwise utilize in accord with the mechanisms described herein—except, as part of the whole of the creative content of which that retained portion is a part. In these instances, the hardcopy can be retained (but, again, preferably, not played) by the original lawful owner or, preferably, by a third party.

Alternatives, as described above, have application in instances where the original lawful possessor wishes to buy back rights in the aforesaid portion and, thereby, to reacquire rights in the whole of the original creative content. They also has application where the original lawful possessor later choses to sell the original creative content "in toto" to the buyer of the aforesaid portion or to another (e.g., if the sold DMO can be acquired back from the buyer of that portion—in exchange for money, credits and/or for a like or other song, article/chapter, scene, etc). Indeed an online retain store, as described above, can facilitate (e.g., through optimized matching of buy/sell lists, auctions, or otherwise) matching-up parties to facilitate such two- and three-way exchanges.

As noted above, the term DMO as used in this section refers to a digital media object or a copy thereof unless otherwise evident from context.

Validation

As noted above, before its sale is permitted by the illustrated system, downloaded content is checked for validity (e.g., as described above in connection with steps 101 and 106), including examination of, e.g., the title of the song or other content of the file, the distributor or other source from where it was originally downloaded, the ID of the purchaser to whom it was originally downloaded, the digital "fingerprint" of the song or content of the file, the ID of the user operating the computer, public or private keys associated with the user account and/or the song or other DMOs, etc.—all as obtained from tags or other metadata associated with the file and/or it may be obtained from registries, libraries or other stores.

Some embodiments of the invention provide other pre-sale validity checks that may be performed by management software 23, 25 instead of or in addition to one or more of those above. These include:

Comparing for disparity the purchase date of a DMO, e.g., as reflected by MP3 tags or other metadata, with its file creation date, e.g., as reflected in the file system of the computer 22 or other attached device, e.g., 32-34, on which that DMO is stored. A disparity and, particularly, a significant one, can suggest—alone or in combination with one or more of the other checks described here—that the DMO was surreptitiously copied.

Examining MP3 tags or other data associated with the DMO for evidence that it may have been surreptitiously altered, e.g., to mask wrongful copying. This can include identifying unexpected tags, unexpected pointers in tag fields and/or tags that are in an order or format atypical (or otherwise unexpected) of a DMO distributed and acquired through rightful channels. Evidence of such alteration and, particularly, a significant one, e.g., an alteration other than might be expected to be performed by a casual user in order, for example, to personalize a legitimately acquired DMO, can suggest—alone or in combination with one or more of the other checks described here—that the DMO was surreptitiously copied.

Examining the cache of a browser or other client-side software (e.g., a Google, Facebook or other client application) executing on computer 22 or other attached device, e.g., 32-34, to determine whether it (the cache) contains a copy of the DMO file, a page whence it may have been downloaded, or other indicia thereof (i.e., of such a copy or page). If so, the management software 23 can check the URL or other accompanying identifying information in the cache to determine whether it is a legitimate download source for such a DMO (e.g., a cloud storage account associated with the user of that computer or attached device). Evidence in such a cache of such a copy of the DMO file, etc., absent evidence that it may have come from a legitimate download source can suggest—alone or in combination with one or more of the other checks described here—that the DMO was surreptitiously copied.

Querying one or more "cloud" storage services (e.g., a Google Music, Apple iCloud, Amazon's cloud storage service etc.) to discern whether a copy of the DMO is currently stored there. Evidence that it is can suggest—alone or in combination with one or more of the other checks described here—that the DMO was surreptitiously copied to the computer 22 or one of the attached devices.

Comparing for similarity a fingerprint of the DMO against fingerprints of those DMOs shown in table(s) on the server 20 or elsewhere as having already been sold by the user of computer 22. Such similarity, when found, may suggest (alone or in connection with one or more of the other checks described here) that the DMO was surreptitiously copied.

Counting or tracking user identifications (userid's) for all DMOs managed by management software 23, 25 or otherwise associated with the user of computer 22 and/or the respective user accounts on the remote server 20. The software 23, 25 can discern those IDs from metadata associated with the DMOs, from tables managed by software 23, 25 (or by other software) on computer 22 and/or remote server 20, or otherwise. While it is expected that a given user may have many, e.g., tens of IDs, an excessively large number e.g., 30-50 or more, may suggest (alone or in connection with one or more of the other checks described here) that the DMOs were surreptitiously copied.

Counting or tracking differences in dates and/or software packages used to "burn" (i.e., convert) a DMO—and other songs, if any, from the same album, CD, DVD or other hardcopy medium—to downloaded form. The software 23, 25 can discern those dates and/or software packages from metadata associated with the DMOs, from the file system of computer 22, and so forth. Evidence that multiple songs from the same album were burned to downloaded form on different dates and/or by different software packages (esp., if they were burned on different dates and by different software packages) may suggest (alone or in connection with one or more of the other checks described here) that those DMOs were surreptitiously copied.

If, by performing the checks above, the management software 23, 25 discerns that a given DMO has or is likely to have been surreptitiously copied, it can, for example, (a) determine whether indeed the DMO is rightfully owned by examining for match the DMO's metadata and fingerprint against table(s) on the computer 22, the server 20 or elsewhere (e.g., records maintained and accessible via APIs of iTunes, Amazon, Google, eBay, etc.) of DMOs of bought and/or sold DMOs by the user of computer 22, and if no such match is found, (b) designate the DMO as ineligible for sale. As discussed elsewhere herein, the user can be warned in the event the DMO is deemed eligible and/or the management software can delete the DMO from computing device 22 and any attached devices, e.g., 32-34.

As noted above, the term DMO as used in this section refers to a digital media object or a copy thereof unless otherwise evident from context.

Described above are systems and methods meeting the objects set forth herein. It will be appreciated that the embodiments illustrated and described herein are merely examples of the invention and that other embodiments incorporating changes thereto fall within the scope of the invention. Thus, by way of non-limiting example, although, the discussion above, e.g., in regard to embodiments of the invention, make reference to "songs" and "music," it will be appreciated that the teachings hereof are likewise applicable to other digital media objects, e.g., video games and other software, videos, movies, electronic books, stories, articles documents, still images (and their corresponding hardcopy format), all by way of non-limiting example.

In view of the foregoing, what we claim is set forth beginning on the pages entitled "Claims," following Appendix A.

ial
APPENDIX A

EXECUTIVE SUMMARY
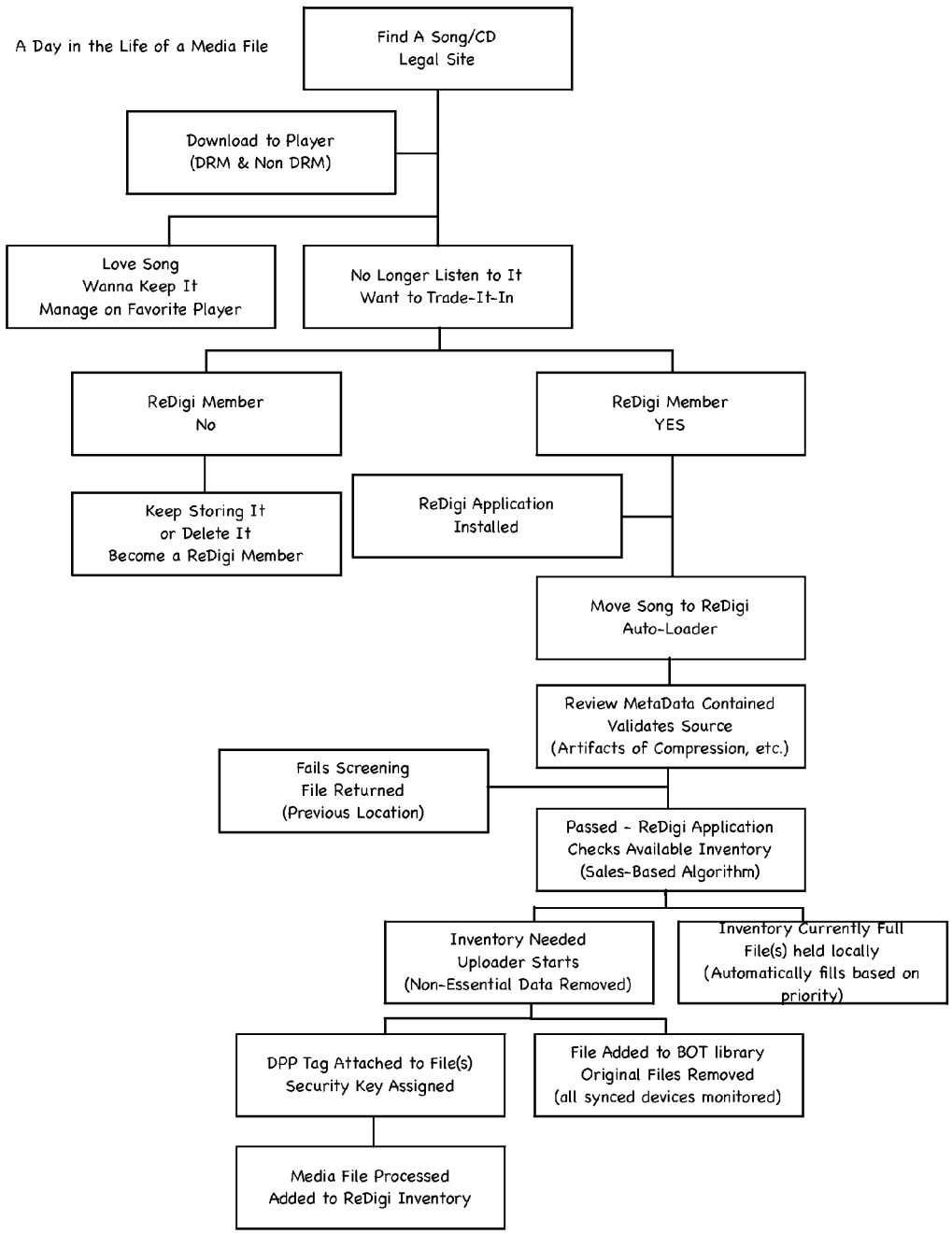
ReDigi™ - The Worlds First Recycled Digital Media Store™

ReDigi™ users access the world's only catalogue of re-cycled, licensed, digital media.

Music, movie, book and game fans will enjoy their favorite artists, actors and authors showcased in a high-quality application that is easy and fun to use. The net result is a low cost unparalleled user experience and a compelling legal alternative to piracy.

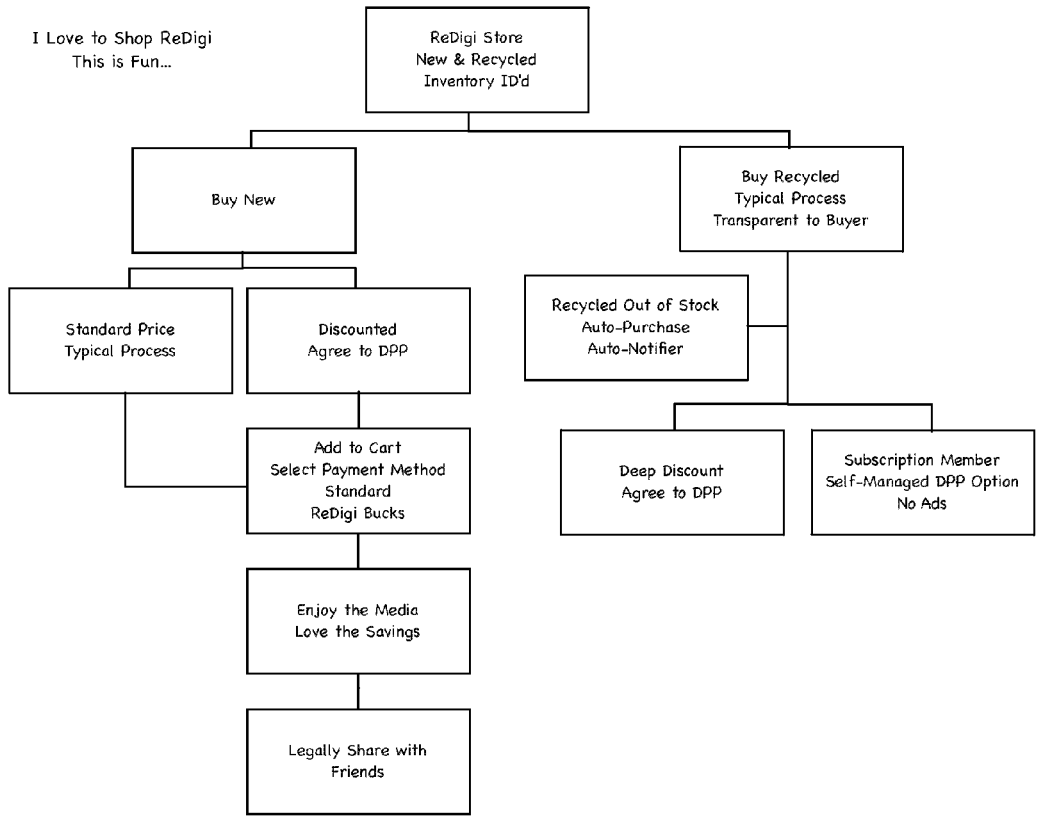

Members can transfer no longer used digital media to the ReDigi™ store in exchange for purchase credit.

ReDigi™ members can earn ReDigiBucks™ by inventorying their unused music on ReDigi™, by searching from ReDigi™, by Shopping on ReDigi™ - then buy any media listed on ReDigi™ with credit from their ReDigi™ Bank account – all very cool, get music, books, movies, games with no cash out of pocket, or if the ReDigi™ account is a little low, its ok to purchase the traditional way.

Promoting media on ReDigi™ is free, individual artist, author and producer areas allow members to build a direct relationship with fans, old and new, across the world. ReDigi™ facilitates the development of revenue streams through the sale of downloads, merchandising, concert tickets and more, as well as, earning a share of revenues ReDigi™ creates through our advertising and premium businesses. Powerful, real-time, in-depth reporting is standard to participating labels and artists, authors, etc.

What is ReDigi™

- ReDigi™ is short for Recycled Digital Media.

- The Market for Digital Media has grown rapidly in the digital music space and is growing even faster with the introduction of digital movie downloads and digital books. Historically, all forms of media have moved to the "used" or "re-sale" marketplace. This is the primary market which ReDigi™ has targeted.

- Why re-sale? Typically the markets for resale are driven by VALUE, those purchasing in that category are most often driven by the ability to save money while getting the exact product they want, not an imitation, rendition or low quality copy.

- ReDigi™ uses proprietary digital fingerprinting technology (ReDigiPrint™) to identify and tag uploaded media, thereby securely removing all synced copies of the same ReDigiPrinted™ file(s).

- ReDigi™ uses a proprietary ReDigiPrint™, DPP, tag that allows legal transfer and sharing of media files.

Cool ReDigi™ Features

Accessibility & Purchasing Options:

Mobile Access
Online Access
Recycled
New

Cool User Features

Great credit for used digital media
Save money on digital media purchases (Discounted New/Used Prices)
Fun and easy to use
Integration with FanAction™ Tickets, find events that match ReDigi™ music purchases in the users area and provides easy digital ticket purchase.

ReDigi™ Benefits

Significant Increased Income per unit sold – New & Recycled media Purchase

Brand Leader in the "used/recycled" marketplace
Increased user marketing data/opportunities
Added Features not seen with ANY other digital media site
Reduces illegal media downloading
Partnership provides total scalability instantly
Latest generation database technology

ReDigi™ Solution

Dynamic Digital Rights Tracking (DDRT) Technology
Dynamic Inventory Management (DIM)
Supplemental Profit Allocation – and instant view back office
Total Media life cycle control and information tracking
- Typical length of ownership, genre, quantity, etc.
- Automated Music preferences algorithm provides suggested items to member

ReDigi™ Features:

Trade-in, Earn & Purchase Digital Media

Swap-Me™ Trade-in media that has been legally purchased/downloaded with an attached DRM or L Code

- *Algorithm provides instant credit allocation to member based on Billboard top 100, Amazon top 50 Video Games, NY times bestsellers.*

- *Identifier scans all Swap-Me™ files for ReDigi™ tags, (Media previously purchased new from ReDigi™ gets additional Swap-Me™ credit).*

Digi Bucks™ Home Page Designed with Digi Bucks Search Bar – SEARCH to earn credits toward purchases.

ReDigi™ refer friends and when they sign up and make first purchase, win credits.

Its-Hot see what your ReDigi™ friends are buying when looking for media, purchase (preferences allow member to block friends view).

Gotta-Have-It™ tag(s) recycled media that you want but currently not in inventory, member is notified via email/Text as soon as ReDigi™ has inventory.

- If member connects to the link and inventory has been sold a Gotta Have It™ discount is provided on a new copy, as long as, member purchases within 20 minutes of logging in. Available for 2 hours after text/email delivery.

Turn-Me-On™ sends your friends a quick clip of media you love, (includes an easy purchase link)

Guess-What-I-Got™ Single touch notifier tells "friends" what you just purchased and provides an instant purchase link.

ADDITIONAL COOL FEATURES

Gift Media™ Allows members to select from listed charities and donate all or a portion of their proceeds to charity

MediaAllocator™ automatically allocates all sales to the appropriate parties including ReDigi™, Label, Artist, etc. (provides real time back office view)

ReDigi Bot™ - cleans all donated digital media files using ReDigiPrint™ technology from all of the members synced and or connected devices, stringent privacy agreement.

Automated owner authenticity.

Media Direct™ provides Instant Links with major social network sites including Myspace, FaceBook, Twitter, Artist etc. for ease of purchasing awareness.

Data Collection/Marketing
- Members
- Members Network

The invention claimed is:

1. A system for management of digital media objects, comprising:
   A. first and second client digital data apparatus in communications coupling with one or more stores,
   B. a digital media object that contains bits encoding any of a song, video game or other software, video, movie, book, story, article, document, and/or image, and that is stored in the one or more stores and accessible by at least one of the first and second client digital data apparatus,
   C. management logic at least one of executing on and in communications coupling with at least one of the first client digital data apparatus and the second client digital data apparatus,
      during a first period of time that corresponds to a time before legal transfer or sharing (collectively, "legal transfer") of the digital media object from a user of the first digital data apparatus to a user of the second client digital data apparatus, the management logic (i) permits the first client digital data apparatus to play the digital media object or copy thereof (hereinafter, collectively, "digital media object"), and (ii) prevents the second client digital data apparatus from playing the digital media object,
      during a second period of time that is mutually exclusive of the first period of time and that corresponds to a time after the legal transfer of the digital media object from the user of the first client digital data apparatus to the user of the second digital data apparatus, the management logic (i) permits the second client digital data apparatus to play the digital media object, and (ii) prevents the first client digital data apparatus from playing the digital media object;
   D. the management logic effecting the legal transfer by performing an atomic operation to change a table to reflect a change of allocation, from the user of the first digital data apparatus to the user of the second digital data apparatus, of an area on a particular one of the stores in which a particular copy of the digital media object is stored; and
   E. the management logic selectively permits, during the first period of time, any of the second client digital data apparatus and a third client digital data apparatus (collectively, "other client digital data apparatus") to play the digital media object or a copy thereof, where the management logic selectively permits such playing as a function of a proximity of the other client digital data apparatus to the first client digital data apparatus.

2. The system of claim 1, comprising a server digital data apparatus that is in communication coupling with at least the first client digital data apparatus and the second client digital data apparatus.

3. The system of claim 1, in which the digital media object comprises content that has been converted to a downloaded format from a hardcopy medium.

4. The system of claim 3, wherein that hardcopy medium includes any of a CD, DVD, vinyl album, book, magazine, or game disk.

5. The system of claim 4, wherein the hardcopy format is sequestered following conversion of the downloaded format therefrom.

6. The system of claim 5, wherein ownership of the hardcopy format is transferred to an owner of the second client digital data apparatus during the second period of time.

7. The system of claim 6, wherein ownership of the hardcopy format is transferred to the owner of the second client digital data apparatus in connection with a transfer-ownership event.

8. The system of claim 1, comprising logic that any of conveys to and deposits on one or more of the other client digital data apparatus, for use on or after a period during which it has been afforded access to the digital media object, any of a link or other indicia of a creative work represented by the digital media object and/or a source from which it can be bought or otherwise acquired.

9. The system of claim 8, comprising logic that credits or otherwise rewards an account associated with the first digital data apparatus in the event that the creative work is bought or otherwise acquired by one or more of the another client digital data apparatus on which the link or other indicia is conveyed or deposited.

10. The system of claim 9, wherein the link is to a retailer of the creative work.

11. A method for management of digital media objects, comprising:
    A. storing at least one of a digital media object and a copy thereof in one or more stores accessible by two or more digital data apparatus, including at least a first digital data apparatus and a second digital data apparatus, where the digital media object contains bits encoding any of a song, a book, a video, a movie, a story, a software application, and a game,
    B. with the management logic at least one of executing on and in communications coupling with at least one of the first client digital data apparatus and the second client digital data apparatus, (i) permitting the first digital data apparatus to play the digital media object or copy during a first period of time that corresponds to a time before legal transfer or sharing (collectively, "legal transfer") of the digital media object, and (ii) preventing the second digital data apparatus from playing the digital media object or copy thereof,
    C. with the management logic, (i) permitting the second digital data apparatus to play the digital media object or copy thereof during a second period of time that is mutually exclusive of the first period of time and that corresponds to a time after the legal transfer of the digital media object, and (ii) preventing the first digital data apparatus from playing the digital media object or copy thereof during that second period of time,
    D. effecting the legal transfer by performing an atomic operation to change a table to reflect a change of allocation, from the user of the first digital data apparatus to the user of the second digital data apparatus, of an area on a particular one of the stores in which a particular copy of the digital media object is stored, and
    E. with the management logic, selectively permitting during the first period of time any of the second client digital data apparatus and a third client digital data apparatus (collectively, "other client digital data apparatus") to play the digital media object or a copy thereof, where the management logic selectively permits such playing as a function of a proximity of the other client digital data apparatus to the first client digital data apparatus.

12. The method of claim 11, comprising conveying to the other client digital data apparatus, for use on or after a period during which it has been afforded access to the digital media object, any of a link or other indicia of a creative work represented by the digital media object and/or a source from which it can be bought or otherwise acquired.

13. The method of claim 12, comprising crediting or otherwise rewarding an account associated with the first digital data apparatus in the event that the creative work is bought or otherwise acquired by one or more of the second client digital data apparatus on which the link or other indicia is conveyed or deposited.

14. The method of claim 13, wherein the link is to a retailer of the creative work.

* * * * *